US011368372B2

(12) United States Patent
Panda et al.

(10) Patent No.: US 11,368,372 B2
(45) Date of Patent: Jun. 21, 2022

(54) DETECTION OF OUTLIER NODES IN A CLUSTER

(71) Applicant: Nutanix, Inc., San Jose, CA (US)

(72) Inventors: Biswa Ranjan Panda, Mountain View, CA (US); Karan Gupta, San Jose, CA (US); Abhinay Nagpal, San Jose, CA (US); Deepthi Srinivasan, Raleigh, NC (US); Roger Sean Liao, Durham, NC (US); Vinayak Hindurao Khot, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/186,400

(22) Filed: Jun. 17, 2016

(65) Prior Publication Data

US 2020/0036596 A1 Jan. 30, 2020

Related U.S. Application Data

(60) Provisional application No. 62/345,396, filed on Jun. 3, 2016.

(51) Int. Cl.
*H04L 41/142* (2022.01)
*G06F 3/06* (2006.01)
(Continued)

(52) U.S. Cl.
CPC .......... *H04L 41/142* (2013.01); *G06F 3/0604* (2013.01); *G06F 3/0659* (2013.01);
(Continued)

(58) Field of Classification Search
CPC ............... H04L 41/0654; H04L 41/142; H04L 43/0817; H04L 41/0668; H04L 41/12; G06F 11/20; G06F 3/0653; G06F 3/067; G06F 3/0604; G06F 3/0659; G06F 3/0664; G06F 3/0673; G06F 3/0614; G06F 3/0632

See application file for complete search history.

(56) References Cited

U.S. PATENT DOCUMENTS 7,770,059 B1 8/2010 Glade et al.
8,549,518 B1 10/2013 Aron et al.
(Continued)

OTHER PUBLICATIONS

Wikipedia. "DBSCAN". Feb. 18, 2014. 4 pages.
(Continued)

*Primary Examiner* — Tonia L Dollinger
*Assistant Examiner* — Joseph M Cousins
(74) *Attorney, Agent, or Firm* — Vista IP Law Group, LLP

(57) ABSTRACT

Systems for cluster computing. A method for detection and remediation of degraded nodes in a cluster commences upon measuring operational aspects of the nodes in the cluster, then determining, based on the measurements and other factors, a suspect set of nodes comprising one or more suspect nodes from the nodes in the cluster that have measurements that are determined to be outliers with respect to remaining nodes that are determined not to be the outliers. A density-based spatial clustering analysis is performed over the suspect set and remediation actions are initiated when results of the density-based spatial clustering analysis identifies a suspect node as being a degraded node.

27 Claims, 21 Drawing Sheets

(51) Int. Cl.
*G06F 11/34* (2006.01)
*G06F 11/30* (2006.01)
*H04L 41/12* (2022.01)

(52) U.S. Cl.
CPC .......... *G06F 3/0664* (2013.01); *G06F 3/0673* (2013.01); *G06F 11/301* (2013.01); *G06F 11/3452* (2013.01); *H04L 41/12* (2013.01)

(56) References Cited

U.S. PATENT DOCUMENTS

| | | |
|---|---|---|
| 8,601,473 B1 | 12/2013 | Aron et al. |
| 8,850,130 B1 | 9/2014 | Aron et al. |
| 8,997,097 B1 | 3/2015 | Aron et al. |
| 9,052,936 B1 | 6/2015 | Aron et al. |
| 9,256,374 B1 | 2/2016 | Aron et al. |
| 9,256,475 B1 | 2/2016 | Aron et al. |
| 9,354,912 B1 | 5/2016 | Aron et al. |
| 9,389,887 B1 | 7/2016 | Aron et al. |
| 9,575,784 B1 | 2/2017 | Aron et al. |
| 9,619,257 B1 | 4/2017 | Aron et al. |
| 9,772,866 B1 | 9/2017 | Aron et al. |
| 9,779,504 B1 | 10/2017 | Biagiotti et al. |
| 2001/0051524 A1* | 12/2001 | Hunzinger ............ H04W 36/24 455/442 |
| 2006/0282893 A1 | 12/2006 | Wu et al. |
| 2008/0016412 A1* | 1/2008 | White .................. H04L 43/08 714/48 |
| 2009/0228589 A1* | 9/2009 | Korupolu ............ H04L 67/1097 709/226 |
| 2010/0242032 A1 | 9/2010 | Ladki et al. |
| 2011/0301998 A1 | 12/2011 | Talwar et al. |
| 2012/0163212 A1 | 6/2012 | Lee et al. |
| 2012/0233665 A1* | 9/2012 | Ranganathan ......... G06F 21/51 726/4 |
| 2013/0166745 A1* | 6/2013 | Dinger .................. H04L 41/06 709/224 |
| 2013/0239111 A1* | 9/2013 | Bingham ............ G06F 11/3409 718/1 |
| 2014/0172971 A1* | 6/2014 | Akkurt ................ H04L 67/1029 709/204 |
| 2014/0344226 A1* | 11/2014 | Rastogi .............. G06Q 30/0202 707/691 |
| 2015/0205691 A1* | 7/2015 | Seto ...................... G06F 11/008 702/182 |
| 2015/0370876 A1* | 12/2015 | Rickard ................ G06F 16/26 707/758 |
| 2016/0085582 A1* | 3/2016 | Farkas .................. G06F 9/485 718/1 |
| 2016/0095135 A1* | 3/2016 | Lv ...................... H04W 72/1289 370/336 |
| 2016/0164963 A1* | 6/2016 | Ganguli ................ G06F 9/5072 709/226 |
| 2016/0204977 A1* | 7/2016 | Cui ...................... G06F 11/00 370/221 |
| 2016/0218951 A1* | 7/2016 | Vasseur .................. H04L 43/12 |
| 2016/0308734 A1* | 10/2016 | Feller ...................... H04L 41/16 |
| 2016/0352866 A1* | 12/2016 | Gupta ...................... H04L 67/42 |
| 2016/0366243 A1* | 12/2016 | Chefalas .................. H04L 67/32 |
| 2017/0046304 A1* | 2/2017 | Chen .................. H04L 67/1097 |
| 2017/0076576 A1 | 3/2017 | Tan |
| 2017/0134237 A1* | 5/2017 | Yang .................. H04L 43/0876 |
| 2017/0293537 A1 | 10/2017 | Sun et al. |
| 2017/0295078 A1* | 10/2017 | Medas ................ H04L 41/0631 |
| 2017/0316005 A1* | 11/2017 | Minh ...................... G06F 11/30 |

OTHER PUBLICATIONS

Notice of Allowance dated Jul. 13, 2018 for related U.S. Appl. No. 15/174,977, 6 pages.
U.S. Appl. No. 15/006,416, filed Jan. 26, 2016, 64 pages.
U.S. Patent Application No. 15/006,435, filed Jan. 26, 2016, 65 pages.
Non-Final Office Action dated Jan. 10, 2018 for related U.S. Appl. No. 15/174,977.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Czechowski, Aaron et al. "Use alerts and the status system for System Center Configuration Manager" (Oct. 5, 2016), from https://docs.microsoft.com/en-us/sccm/core/servers/manage/use-alerts-and-the-status-system, pp. all.
Notice of Allowance dated Mar. 20, 2020 for related U.S. Appl. No. 16/051,296.
Cano, I. et al., "Curator: Self-Managing Storage for Enterprise Clusters", 14th USENIX Symposium on Networked Systems Design and Implementation, NSDI '17, (Mar. 27, 2017).

* cited by examiner

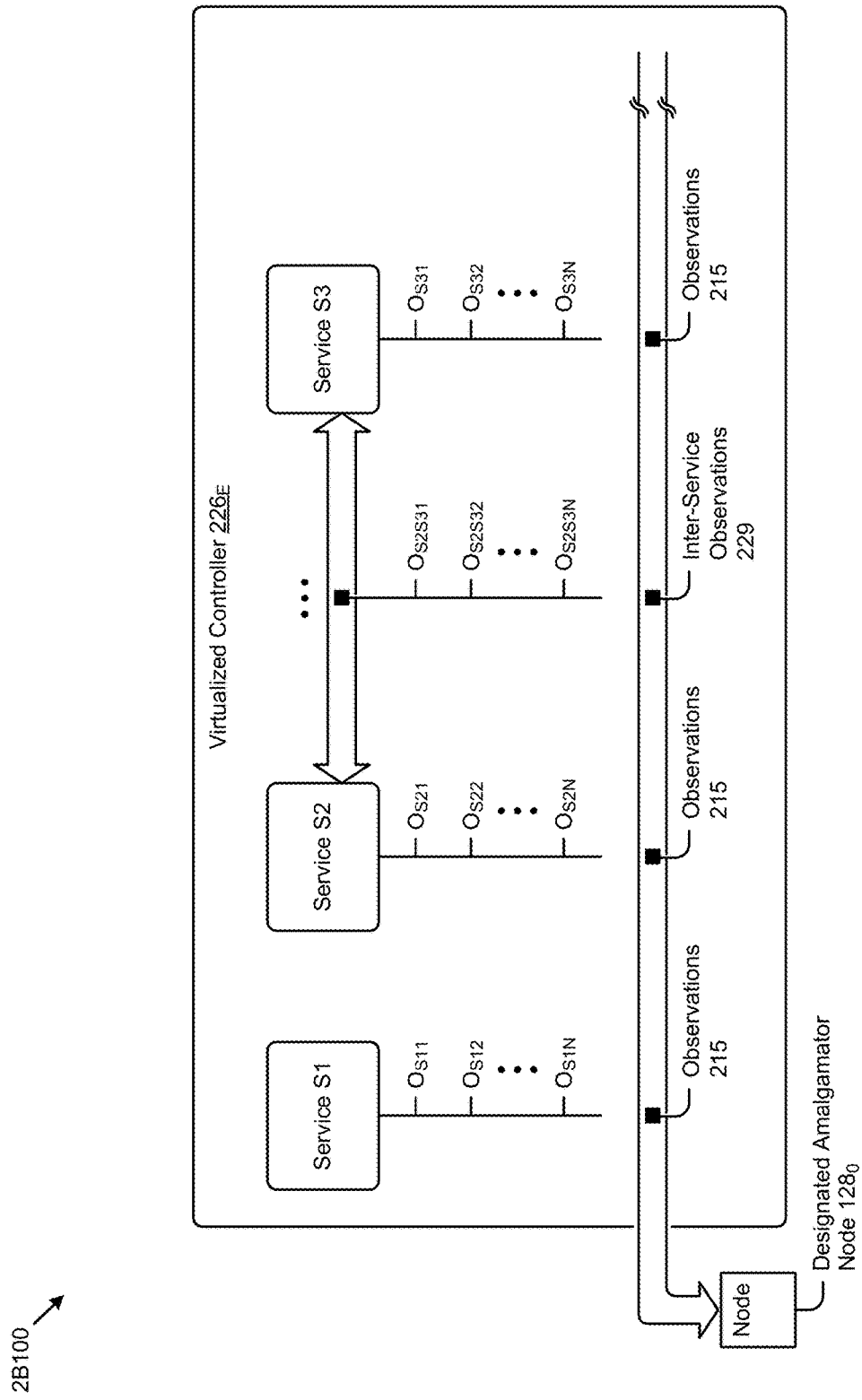
FIG. 2B1

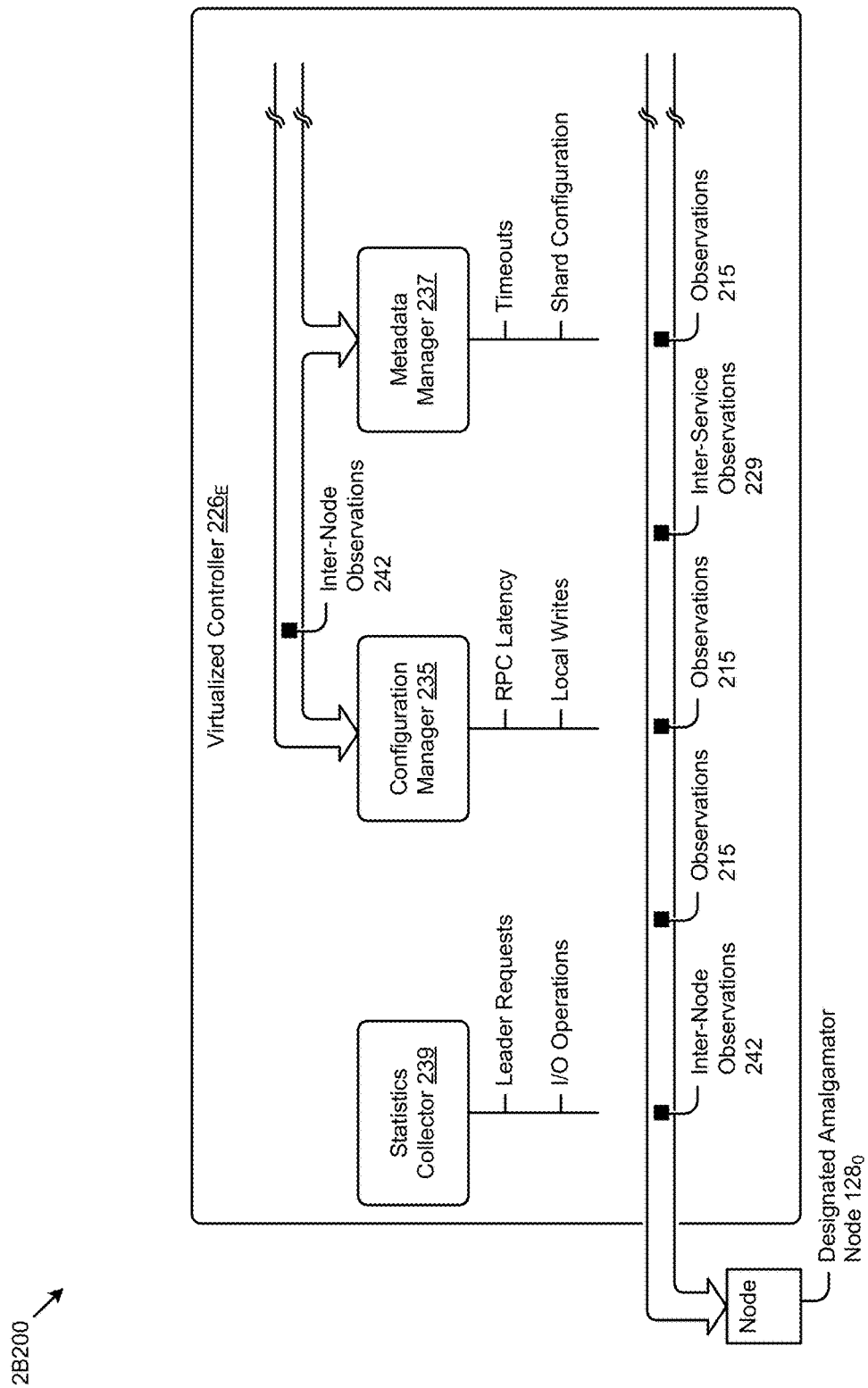
FIG. 2B2

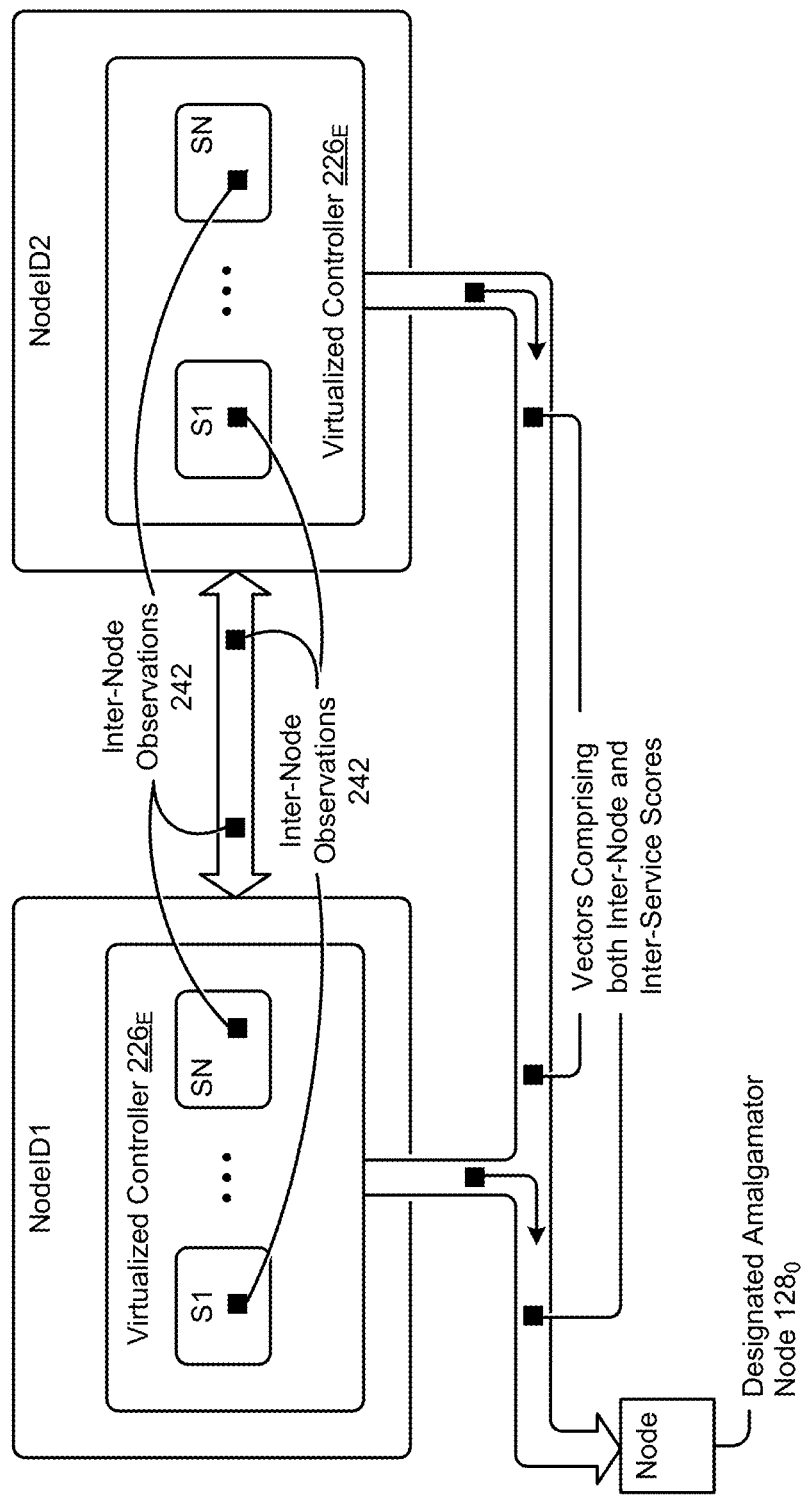
FIG. 2B3

DETECTION OF OUTLIER NODES IN A CLUSTER

RELATED APPLICATIONS

The present application claims the benefit of priority to U.S. Patent Application Ser. No. 62/345,396 titled, "DETECTION OF DEGRADED NODES IN A CLUSTER", filed Jun. 3, 2016, which is hereby incorporated by reference in its entirety.

FIELD

This disclosure relates to cluster computing, and more particularly to techniques for detection of performance-wise outlier nodes in a cluster.

BACKGROUND

Modern highly-available and highly-resilient computing clusters often comprise tens or hundreds or even thousands of individual nodes. The parallelism present in many modern computing tasks can be exploited by dividing the computing workload into master-slave groups (e.g., in a map-reduce configuration) and/or into pipelines and/or into fork-join groups. Any of such parallelization techniques can be used to map portions of the workload onto a node or onto groups of nodes in the cluster. Unfortunately, there are many classes of parallelized computing tasks that run only as fast as the slowest node. As the number of nodes involved in the computing group increases, so does the likelihood that there is at least one node that operates significantly slower than the other nodes. Even one slow-performing node in a parallelized computing group can deleteriously affect the performance of the entire computing task. For example, if there is one node from among a pipeline formed of (for example) one hundred nodes (e.g., with each node performing computing corresponding to one phase in a one hundred stage pipeline) and that one node that is a low-performing node, the entire pipeline runs only as fast as the one low-performing node. A node can become a low-performing node for many reasons, some of which reasons are a matter of degree such that a low-performing node might continue to degrade more and more over time.

Unfortunately, while there are legacy diagnostic tools that can identify a non-responsive node, such legacy diagnostic tools frequently rely on a priori known parameters (e.g., CPU load, memory utilization, network I/O parameters, etc.). Use of a priori known parameters are often ineffective to identify degraded or degrading nodes early enough such that corrective actions can be taken before the performance of the entire cluster is affected. Moreover, legacy techniques are naive at least with respect to appropriate thresholds that are reasonable to be used in detection and classification of many forms of node degradation.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for detection of degraded nodes in a cluster, which techniques advance the relevant technologies to address technological issues with legacy approaches. More specifically, the present disclosure provides a detailed description of techniques used in systems, methods, and in computer program products for detection of degraded nodes in a cluster. Certain embodiments are directed to technological solutions to measure, predict, and remediate on the basis of relative metrics rather than on absolute metrics. Moreover, different kinds of performance degradation are addressed by different kinds of remediation.

The disclosed embodiments modify and improve over legacy approaches. In particular, the herein-disclosed techniques provide technical solutions that address the technical problems attendant to identifying degraded or degrading nodes in a cluster early enough such that corrective actions can be taken before performance of the entire cluster is affected. Such technical solutions serve to reduce the demand for computer memory, reduce the demand for computer processing power, reduce network bandwidth use, and reduce the demand for inter-component communication.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

FIG. 2B1 and FIG. 2B2 depict service-level observations as provided by a virtualized controller, according to an embodiment.

FIG. 2B3 depicts inter-node communication of service-level observations, according to an embodiment.

DETAILED DESCRIPTION

Figure 1A:
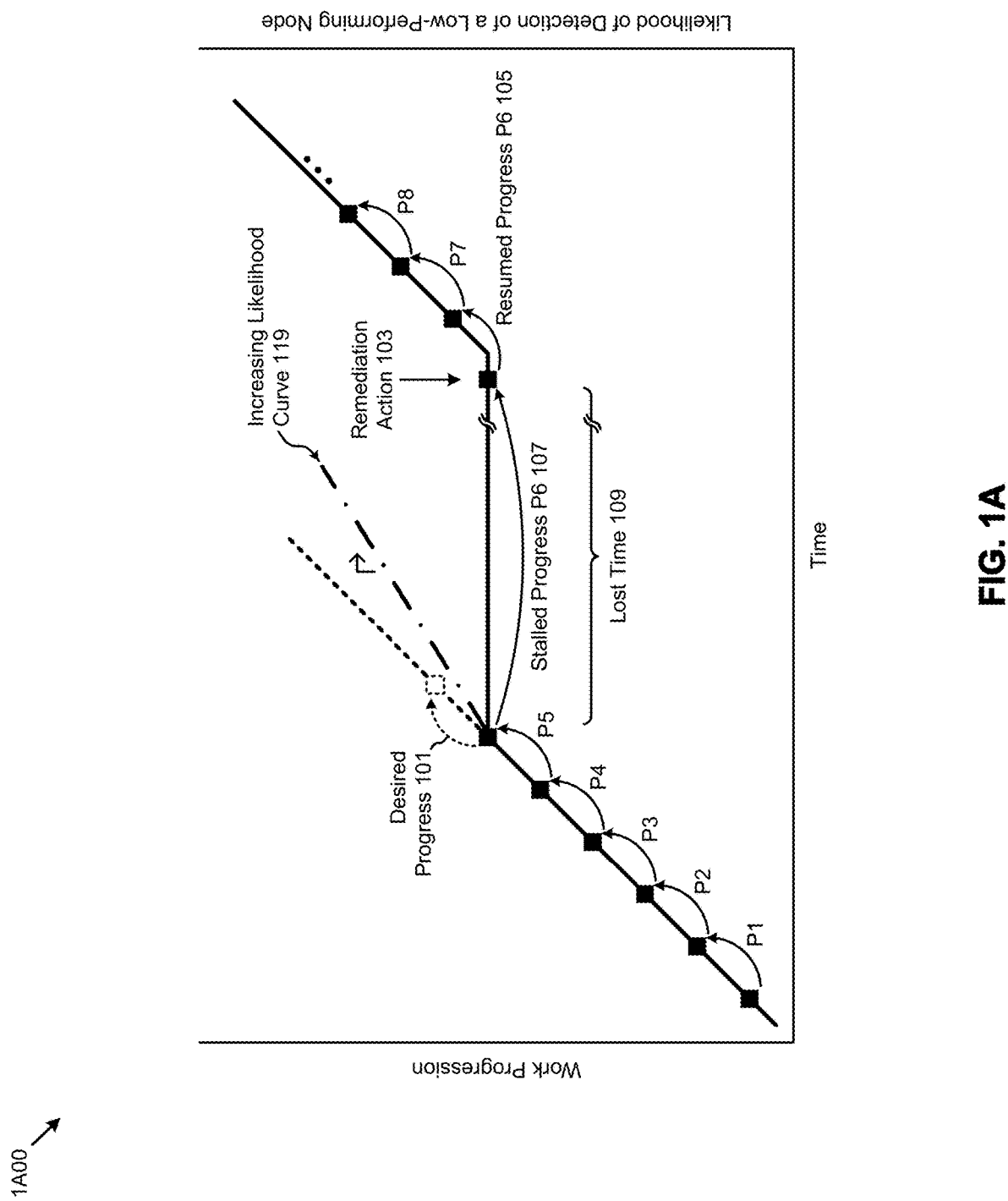
FIG. 1A depicts the effect of lost time due to stalled progress.

Some embodiments of the present disclosure address the problem of identifying degraded or degrading nodes in a cluster early enough such that corrective actions can be taken before performance of the entire cluster is affected. Some embodiments are directed to approaches for measuring, predicting, and remediating on the basis of relative metrics rather than on absolute metrics that pertain to a "worst-performing" node. The accompanying figures and discussions herein present example environments, systems, methods, and computer program products for detection of degraded nodes in a cluster.

Overview

A single partially-available node can bring down or stall an entire computing cluster. As used herein, a partially-available node is a node which, although it has not completely failed (e.g., due to loss of power, etc.), is suffering degradation either due to hardware or software or both. In many computing workloads, other nodes of the cluster might rely on the results of the node that has degraded such that workload throughput of the entire cluster is deleteriously affected, and this reliance in turn results in lower-than-expected performance of the cluster as a whole. A node can degrade for many reasons. Strictly as examples, a node can suffer degradation due to:

High CPU usage caused by workload allocation (e.g., overloading) or due to software defects.

Memory problems and/or memory errors that can cause the memory on a node to stall.

Disk errors and/or disk conditions such as, for example, disk full scenarios or disk failure can cause soft lockups in the operating system.

Network issues such as network packet dropping, network intermittency, network speed issues, etc.

Software errors such as stuck services and/or loss of leadership and/or loss of tokens and/or caching issues.

Rather than relying solely on a priori known parameters, analysis of service-level interactions that stem from execution of processes that are mostly indirectly related to the a priori known parameters can identify problem spots. Strictly as one example, adding new hardware with potentially new characteristics that might not be exposed or directly measurable can nevertheless be considered in classification of a node as "OK" or as a performance outlier. For example, inter-node and/or intra-node service-level interactions can be processed and compared to prior-captured observations so as to identify changes in the service-level behaviors. Statistically unexpected behavior of service-level observations can be a leading indicator that a node is degraded.

When a degraded node is identified, then actions can be taken to remediate the node degradation. Strictly as one particular flow, identification and remediation can comprise the following activities:

Reporting. Any node running monitoring processes or threads can periodically assign a score to monitored components and publish such scores to a repository (e.g., to a global, distributed consistent database).

Detection and Alerting. Scores are analyzed on a per component basis. For each component, scores assigned to each of its instances are read, then analyzed (e.g., using a clustering algorithm). Outlier (e.g., low-performing) component instances (if any) are determined. The outlier component is marked as "degraded" and an alert is generated.

Action. Remedial actions may include steps as per the following. Any of the remedial steps can be taken in whole or in part, and any of the remedial steps can be applied in any order. Remedial steps might include:
1. Revoke leadership roles of critical tasks being performed by the degraded node.
2. Reboot the degraded node.
3. Place a degraded node into a maintenance mode.
4. Restart services that are suspected causes of the degradation.
5. Reboot the degraded node.

Reasons for degradation of a node might be known or might be unknown. Any sources of information can be used to identify the cause or contributors to degradation. Such sources of information might include (1) a node "health" database, (2) a status report received by any one or more services running on a node, and/or (3) reports or scores or votes as collected by services running on other nodes. Any such reasons or hypotheses or suspect reasons can be reported to a cluster administrator.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Reference is now made in detail to certain embodiments. The disclosed embodiments are not intended to be limiting of the claims.

Descriptions of Example Embodiments

FIG. 1A depicts the effect of lost time due to stalled progress 1A00.

The embodiment shown in FIG. 1A is merely one example of a workload that is mapped onto a pipeline formed of a series of nodes, where each node performs operations pertaining to a particular stage of the workload pipeline. As shown, progress proceeds from node to node. Progress P1 is achieved as the workload computations progress from a first node to a second node. Progress P2 is achieved as the workload computations progress from the second node to a third node, and so on through achievement of progress P3, progress P4, and progress P5. The desired progress 101 is shown as a dotted line. To illustrate the effect of stalled progress P6 107, FIG. 1A depicts lost time 109, and well as the effect that the workload progression does not increase.

At some point, for example using the techniques disclosed herein, there may be some remediation action 103, which has the effect to remediate (e.g., replace or "un-stall" the degraded node) which, in turn, is then able to resume progress (e.g., at resumed progress P6 105, progress P7, and progress P8, etc.).

Using the herein-disclosed techniques, the likelihood of detection of the occurrence and source of degradation effects (e.g., the occurrence of a low-performing node or other components) that are responsible for the stalled progress increases as time goes on (e.g., see the shown increasing likelihood curve 119).

In some cases, a higher number of nodes in a cluster increases the likelihood of earlier detection of a stalled component. For example, with a higher number of nodes there are commensurately more neighbor nodes (e.g., "witnesses") that report scores for a particular node. Given the presence of a greater number of witnesses, any of which can potentially report different observations and/or measurements, the possibility of earlier detection of a stalled component is increased. Earlier detection of a stalled component becomes more and more important as the number of nodes in a cluster increases, at least because of the effect that the costs of a stalled node are often super-linearly related to the number of in-use nodes in a cluster.

Figure 1B:
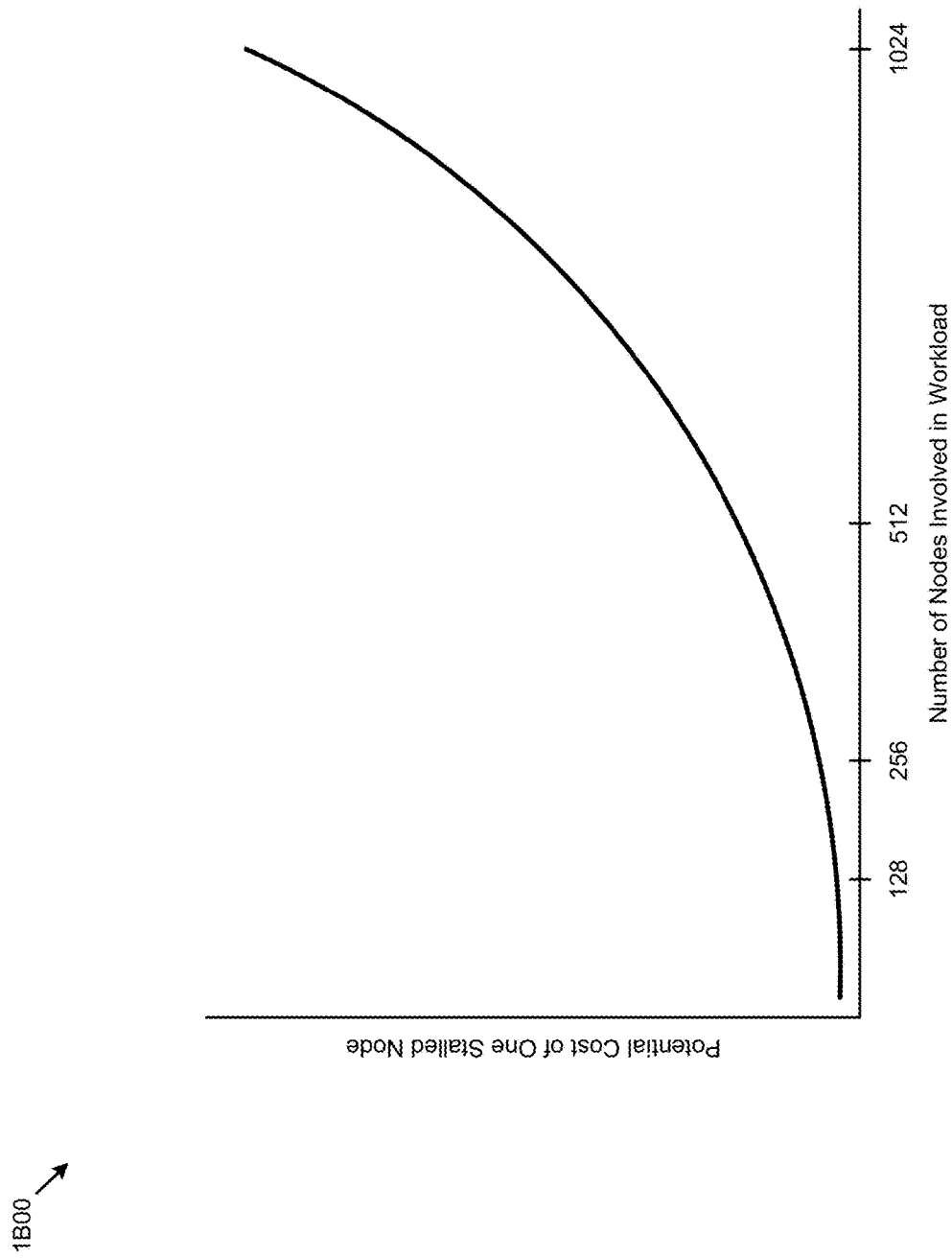
FIG. 1B depicts cost effects of the stalled progress of one node as plotted against the number of nodes in a cluster.

FIG. 1B depicts cost effects of the stalled progress 1B00 of one node as plotted against the number of nodes in a cluster. As an option, one or more variations of stalled progress 1B00 or any aspect thereof may be implemented in the context of the architecture and functionality of the embodiments described herein. The stalled progress 1B00 or any aspect thereof may be implemented in any environment.

In some workloads, the effect of just one stalled node can impact the performance of the entire workload. As one example, consider a fork-join scenario where a master task (e.g., on a node designated as Node0000) spawns 1023 worker tasks assigned to nodes Node0001 through Node1023, and then the master task waits for completion of the last worker task before progressing to a next step. As can now be understood, if even one of the nodes involved in processing the worker tasks is degraded, then the join cannot occur, and all remaining worker task nodes are forced into a wait state until the join can be traversed.

Using techniques disclosed herein, the potentially very high costs of a stalled or degraded node can be detected early such that the stalled or degraded node can be remediated (e.g., so as to un-stall the node) or replaced with a substitute node in its stead. Some detection techniques are shown and discussed as pertains to FIG. 1C.

Figure 1C:
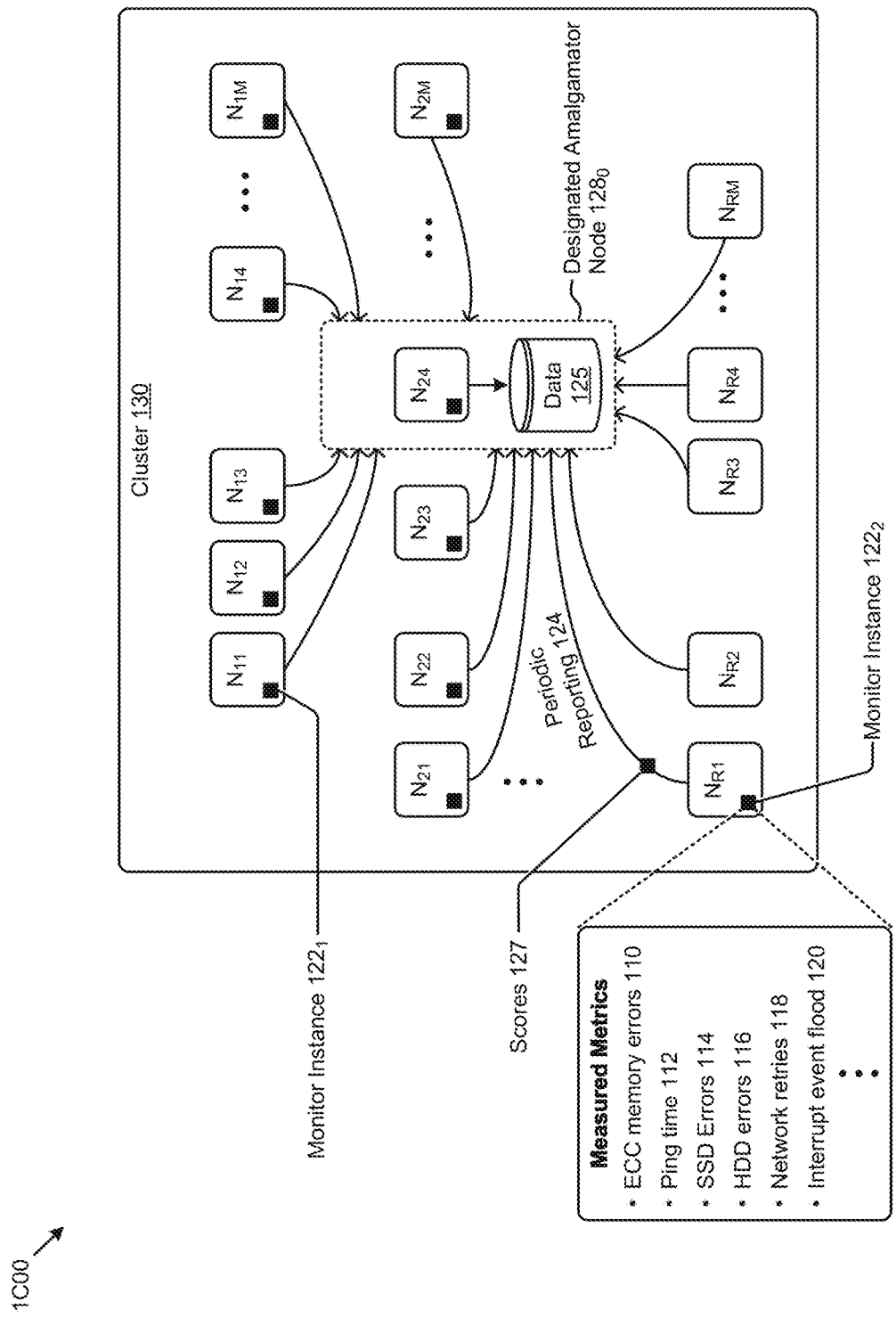
FIG. 1C depicts a computing cluster setting having multiple monitor instances as used for detection of degraded nodes in a cluster, according to an embodiment.

FIG. 1C depicts a computing cluster setting 1C00 having multiple monitor instances as used for detection of degraded nodes in a cluster. As an option, one or more variations of computing cluster setting 1C00 or any aspect thereof may be implemented in the context of the architecture and functionality of the embodiments described herein. The computing cluster setting 1C00 or any aspect thereof may be implemented in any environment.

As shown, cluster 130 includes an array of nodes (e.g., $N_{11}$, $N_{12}$, $N_{13}$, $N_{14}$, ..., $N_{1M}$, etc.). Each node includes an instance of a monitoring module (e.g., monitor instance $122_1$, monitor instance $122_2$). Each monitor instance in turn can receive or make observations and can receive or take measurements and can make and record metadata or data pertaining to the observations and/or metrics.

Measured metrics can include any measurement or observation or calculation that can be taken, observed, or calculated at a particular node. Strictly as examples, measured metrics might include counts or rates of ECC memory errors 110, occurrences or statistics pertaining to ping times 112, solid state drive errors (e.g., SSD errors 114), hard disk errors (e.g., HDD errors 116), occurrences or statistics pertaining to network retries 118, and/or occurrences or statistics pertaining to any observed interrupt event flood 120, etc.

Measured metrics can be sent to a designated node (e.g., in the same cluster or in a different cluster) such as the shown designated amalgamator node $128_0$. Measured metrics can be stored in node-local storage such as the shown persistent node-local storage (e.g., data 125) that pertains to the designated amalgamator node, or measured metrics can be stored persistently in a storage pool (e.g., see the storage pool of FIG. 2A). The sending can be performed periodically over a cluster backplane as depicted by the arrows from a node to the designated amalgamator node (e.g., see periodic reporting 124 from node $N_{R1}$ to node $N_{24}$, etc.).

The depiction of FIG. 1C is merely one embodiment. In this and other cluster configurations, scores 127 are collected periodically using any of one or more sets of metrics. Different metrics can be assigned to different components. Any such score assigned to a peer is captured as a raw score. Raw scores can be normalized to, for example, a value between 0 to 100 (e.g., with 0 being the "best" and 100 being the "worst"). Periodically, a set of raw scores are aggregated and the median score per peer instance is extracted. At regular intervals, the sets of median scores collected for all peer instances (peer scores) are written to a persistent repository. Any component that is able to publish scores can use a separate directory in a persistent repository.

In some cases, a particular node interacts with neighboring peer nodes (see FIG. 4) so as to assign scores to their peers in the cluster. As such, even if a particular node fails or is taken out of service, one or more peer nodes in the same "neighborhood" can perform the score assignments and/or reporting.

In some cases, a cluster is configured for high availability. Strictly as one possibility, a monitor can periodically (e.g., every 10 seconds) send an inquiry message to a randomly selected subset of peers so as to request their "health status". The subset of peers selected at any iteration can be in accordance with a predetermined set of rules, or can be selected randomly (selected from the total number of nodes in the cluster excluding itself). As such, many monitors can report scores for many peers.

In addition to the aforementioned health status messaging, a particular peer node can issue a "write status check message". Upon receipt of such a write status check message, the subject peer node responds immediately (if possible). If the local write is not possible, or if the local write is intermittently failing, then the inquiring peer will record a corresponding observation. When local write is possible, then the inquiring monitor gets a reply from the subject node and records the measured round trip time for the call and response as a score for the subject peer node. Every such score is collected individually for each peer. Sets of non-degraded nodes have similar score values. Periodically, a designated amalgamator node aggregates groups of node scores for statistical analysis. For example, the median score for a peer might be calculated. Also, an administrator (e.g., user) might specific a periodicity (e.g., every 60 seconds) to describe a recurrence time interval according to which time interval the then-current accumulated median scores are published in an amalgamated score report. Scores can be assigned to peer instances by periodically collecting node stats and using the stats with various statistics and/or clustering algorithms to identify outlier or suspected stalled or low-performing nodes.

The aforementioned designated amalgamator node $128_0$ can include monitoring tasks or daemons in any form. For example, a daemon might perform regular periodic checks (e.g., heap usage statistics, stage counter statistics, etc.), and such a daemon might also perform any tasks pertaining to scoring and/or amalgamation and/or reporting and/or initiation of remediation actions, etc. Any persistent or ephemeral record pertaining to scores, amalgamation, and/or initiation of remediation actions might comprise a node ID and/or a node IP address, timeout and response statistics, and statistics characterizations. For example, in some cases, statistics are rotating or filtered or sliding statistics that reflect a set of observations taken over a recent time period (e.g., over the last 2 minutes).

When a node is detected as being a low-performing node, or for any reason is deemed to be contributing to stalled progress, then an alert might be sent to a remediation facility, which in turn can be administered by a user. Many remediation techniques are discussed hereunder.

Figure 2A:
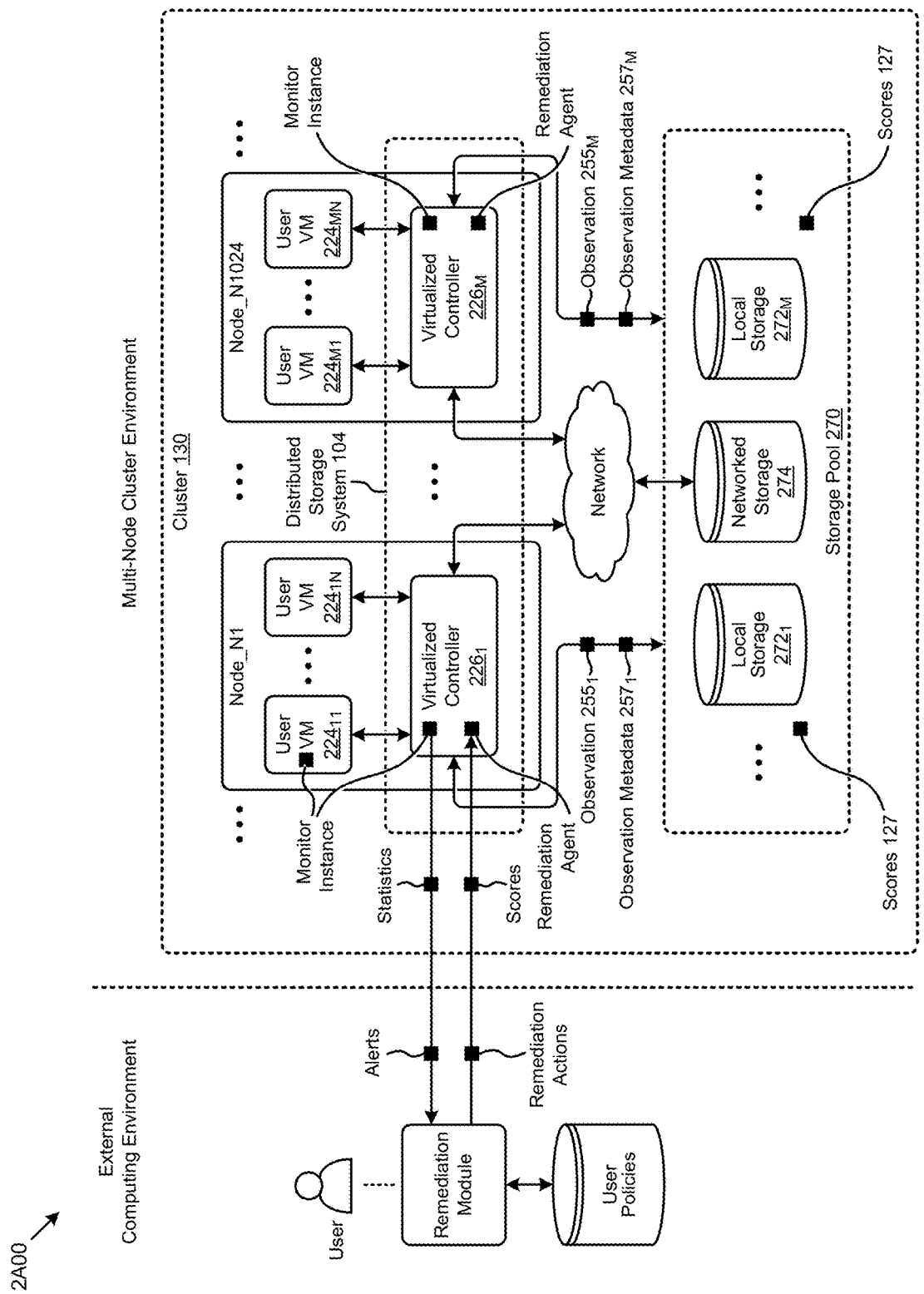
FIG. 2A is a diagram depicting a remediation technique as used to manage a multi-node cluster, according to an embodiment.

FIG. 2A is a diagram depicting a remediation technique 2A00 as used to manage a multi-node cluster having a virtualized storage controller assigned to each node. As an option, one or more variations of remediation technique 2A00 or any aspect thereof may be implemented in the context of the architecture and functionality of the embodiments described herein. The remediation technique 2A00 or any aspect thereof may be implemented in any environment.

As shown, the cluster 130 is composed of nodes, each of which includes a virtualized controller (e.g., virtualized controller $226_1$, virtualized controller $226_M$). Any of the virtualized controllers can host a monitor instance and/or a remediation agent. Moreover, any instance of a virtualized controller can take measurements that are specific to I/O (input/output or IO) operations to/from the storage pool 270. More particularly, the storage pool includes any form of SSD or HDD or other storage that is local to a particular node (e.g., local storage $272_1$, local storage $272_M$) as well as networked storage 274. The virtualized controllers can interact each other and/or can interact with a remediation module, which remediation module might be situated in a remote or external computing environment. Alerts are sent from each virtualized controller to the remediation module, and remediation actions are sent from the remediation module to node-specific instances of virtualized controllers.

A set of virtualized controllers can be combined to form and administer a distributed storage system 104. Further, any node can comprise a hypervisor (not shown) and any number of user virtual machines (e.g., user VM $224_{11}$, . . . , VM $224_{1N}$, VM $224_{M1}$, . . . , VM $224_{MN}$, etc.). A monitor instance can be situated in any user virtual machine. Moreover, any of the virtualized controllers or monitor instances can store scores 127, observations (e.g., observation $255_1$, observation $255_M$) and/or data pertaining to the scores or observations (e.g., observation metadata $257_1$, observation metadata $257_M$).

A remediation module can take or initiate remediation actions based on user input and/or user policies. Moreover, a remediation module can take or initiate remediation actions based on alerts and/or statistics. In exemplary cases, a remediation module is used to identify a degraded or degrading node (e.g., based on any of the aforementioned alerts and/or statistics).

FIG. 2B1 depicts service-level observations 2B100 as provided by a virtualized controller. As shown, FIG. 2B1 depicts a virtualized controller $226_E$ that hosts a plurality of service modules (e.g., service S1, service S2, . . . , service S3, etc.). Any service module can format and calculate service-level observations by receiving taken measurements and/or observations 215 that derive from collected data gathered either from within its scope or from observable values or statistics that are communicated between service modules. Service-level observations are observations that are received by a service module within a virtualized controller, and/or observations that result from operation of a service module within a virtualized controller, and/or observations that are calculated by operation of a service module within a virtualized controller.

In the shown embodiments a first service module performs a first service S1 that can take and communicate observations $O_{S11}, O_{S12} \ldots, O_{S1N}$. Also, in this embodiment a second service module performs a second service S2 and can take and communicate observations $O_{S21}, O_{S22} \ldots, O_{S2N}$. Still more, in this embodiment an Nth service module performs an Nth service S3 and can take and communicate observations $O_{S31}, O_{S32} \ldots, O_{S3N}$. Furthermore observations that occur as between service modules can be taken and processed and stored and/or forwarded by any service module. As shown, some observations occur between the service module for service S1 and the service module for service S3 (e.g., $O_{S2S31}, O_{S2S32}, \ldots, O_{S2S33}$). The inter-service observations 229 can be sent to a designated amalgamator node $128_0$.

FIG. 2B2 depicts service-level observations 2B200 as provided by a virtualized controller. The selection of services is purely illustrative and other services with other names are possible. As shown, a first node hosts a virtualized controller $226_E$ that in turn hosts a plurality of service modules comprising a statistic collector 239, a configuration manager 235, and a metadata manager 237.

A virtualized controller can communicate with other nodes. Communication between nodes might include inter-node observations that derive from any operational unit on another node. In some cases communication between a first node and a second node might include inter-node observations 242 that derive from the second node and are sent to and received by the first node (as shown in FIG. 2B3). Strictly as examples, a statistic collector 239 might observe leadership requests and/or any forms of I/O commands or operations. A configuration manager 235 might observe remote process call (RPC) latency and occurrences of local writes, and a metadata manager 237 might observe timeouts and shard configuration changes.

A virtualized controller can be hosted by any node, and the virtualized controller in turn can host any number of services and/or mixtures of services and/or variations of services. Strictly as examples, services can include I/O managers, garbage collection services, statistics collectors, health monitors, etc.

FIG. 2B3 depicts inter-node communication of service-level observations. In some cases, and as shown, inter-node observations are service-level observations received by a first node after being originated from a second node. The service-level observations can originate from a first type of service (e.g., a configuration manager) to be sent onward to a different node (e.g., over a network or backplane) for receipt by a service of a second type of service (e.g., a metadata manager). Any plurality or variations of observations can be formatted into a vector (see FIG. 2C). The vectors can comprise both inter-node observations or scores as well as inter-service observations (e.g., performance observations) and/or scores (e.g., performance scores).

Figure 2C:
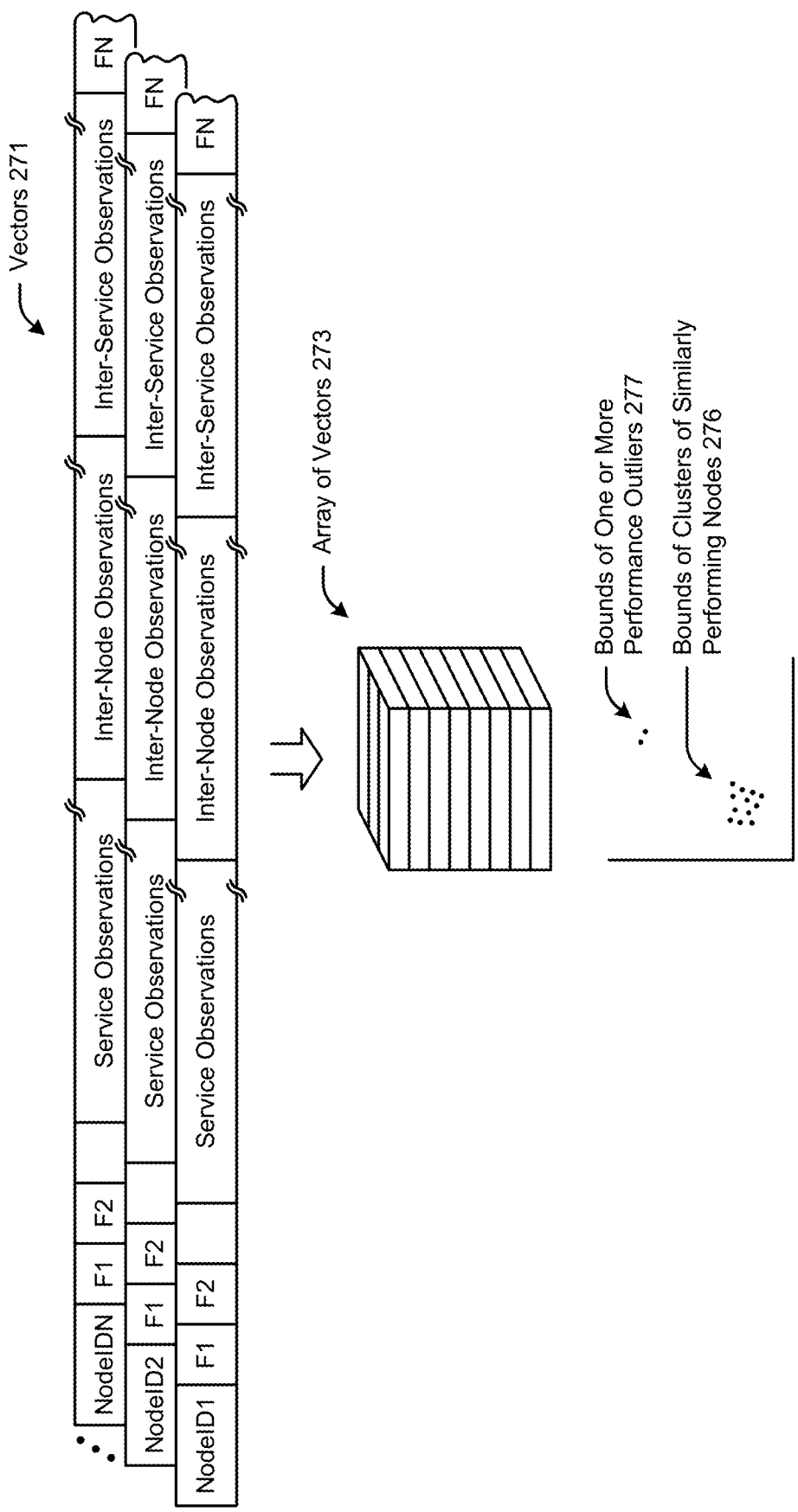
FIG. 2C depicts a use model for performing clustering over vectors of service-level observations, according to an embodiment.

FIG. 2C depicts a use model for performing clustering over vectors of service-level observations. As shown, vectors 271 are composed of a node identifier (e.g., Node ID) that identifies the node that originates or amalgamates the observations. Observations can be in the form of service-level observations from a particular service of that node, and/or can comprise inter-node observations processed by that particular node, and/or can comprise inter-service observations processed by that particular node. Additionally, and as shown, the vectors can be composed of a node identifier that identifies the node that corresponds to any structural or performance feature (e.g., feature F1, feature F2, . . . , feature FN). A collection of such vectors can be organized into an array 273 that can be order (e.g., ordered by time or ordered by node, or ordered by a particular performance feature, or ordered by some other value). The array can be processed so as to conform to any format as may be permitted by a clustering engine that performs outlier clustering algorithms and/or outlier detection algorithms. Such a clustering engine might employ a graphical user interface so as to present bounds of clusters of similarly performing nodes 276 as being distinct from the bounds of another cluster comprising one or more performance outliers 277. Any number of instances of performance outlier nodes might be grouped together as being deemed (e.g., classified) to be underperforming or degraded nodes, or they might be deemed (e.g., classified) to be super-performing nodes. The node ID of any of the nodes in any grouping or classification can be derived from the Node ID field of the feature vector.

Figure 3A:
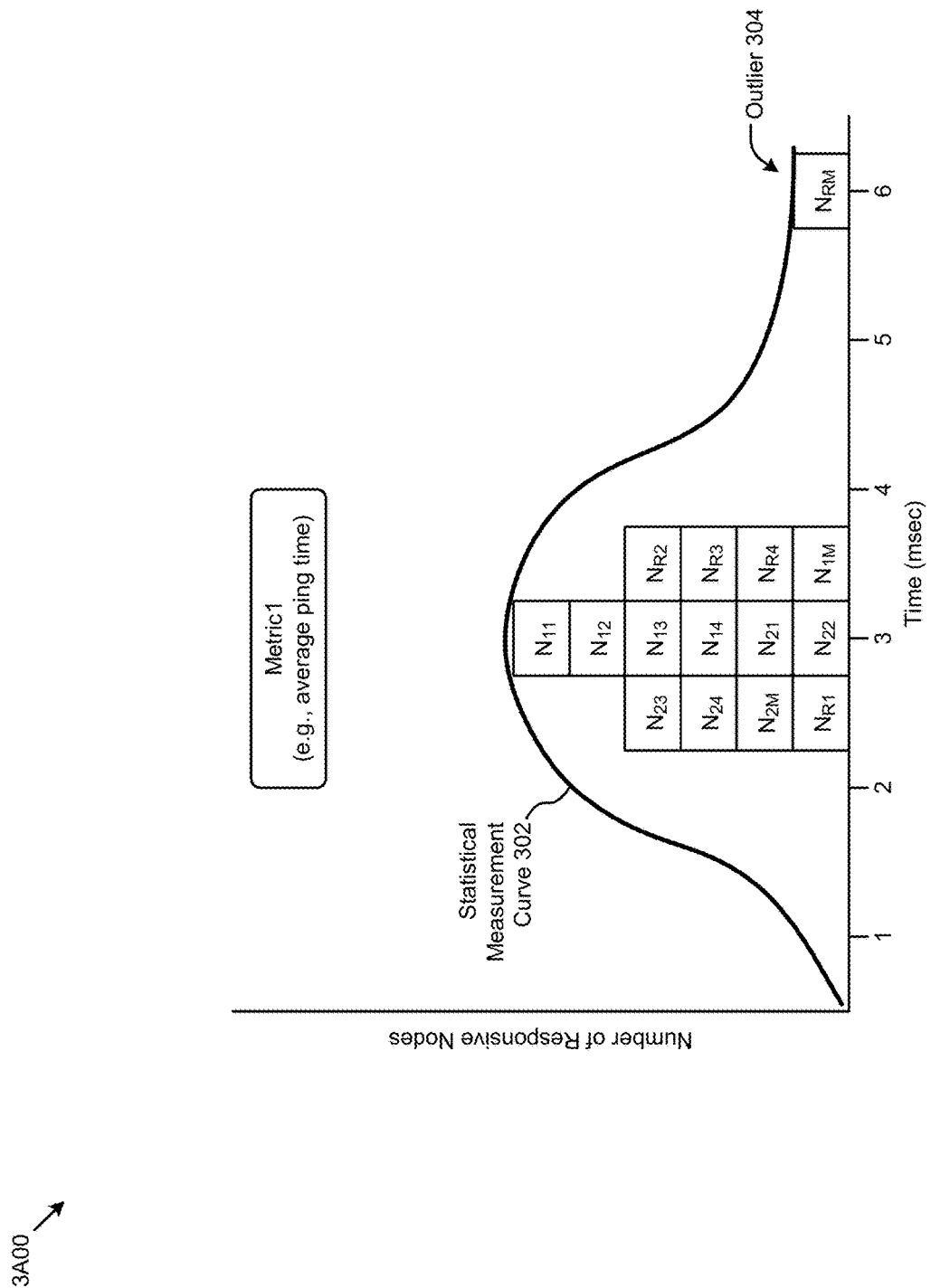
FIG. 3A is a diagram depicting a statistical outlier identification technique as used to manage a multi-node cluster, according to an embodiment.
Figure 3B:
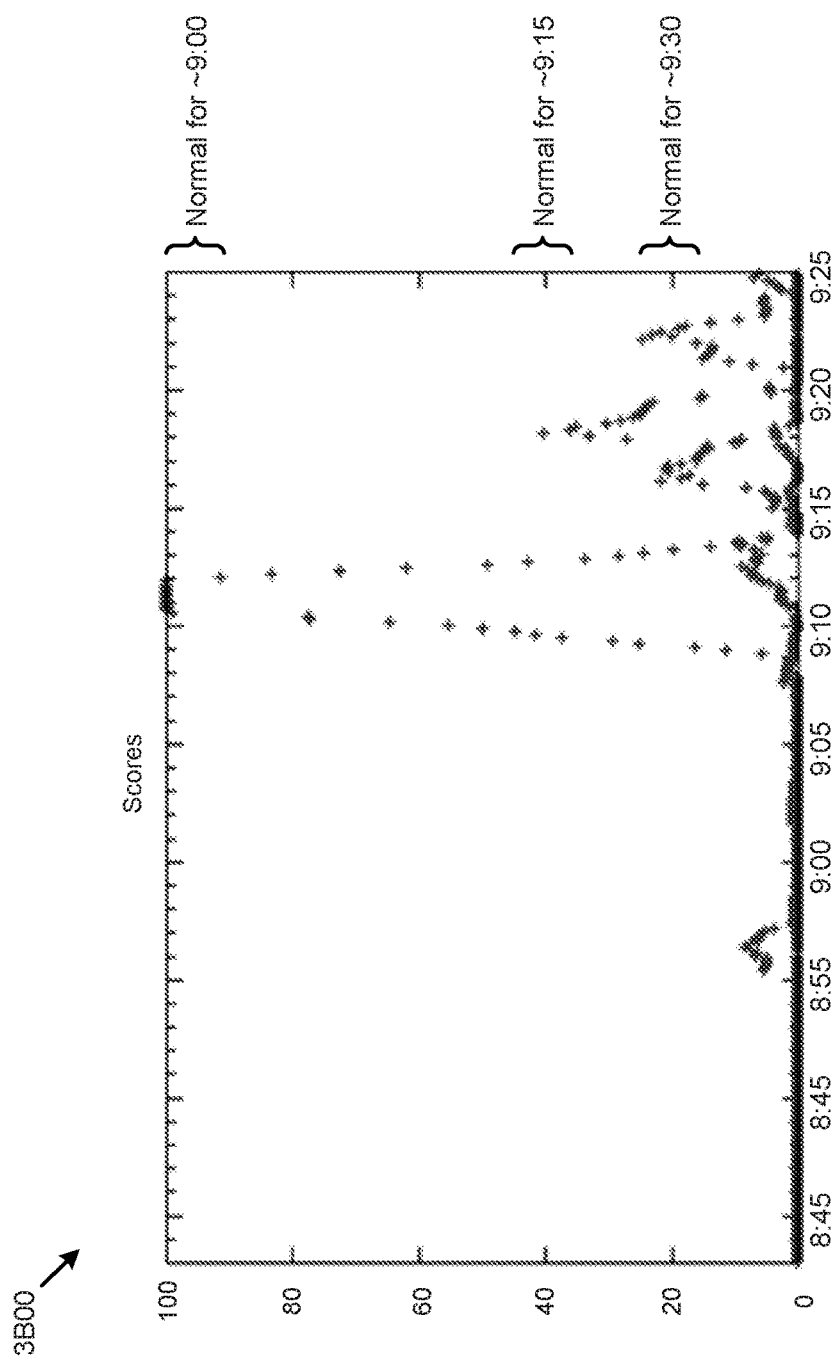
FIG. 3B is a diagram depicting an alternate outlier identification technique as used to manage a multi-node cluster, according to an embodiment.

FIG. 3A and FIG. 3B are diagrams that depict different types of statistical outlier detection techniques that can be used in various settings and/or using various outlier detection algorithms (e.g., clustering algorithms) to identify an outlier. The outlier detection algorithms can operate on different types of input scores to detect an outlier. Any of the disclosed outlier identification techniques can compute a score (e.g., raw, normalized, etc.) that can be combined with other scores to detect an outlier.

FIG. 3A is a diagram depicting a statistical outlier identification technique 3A00 as used to manage a multi-node cluster. As an option, one or more variations of statistical outlier identification technique 3A00 or any aspect thereof may be implemented in the context of the architecture and functionality of the embodiments described herein. The statistical outlier identification technique 3A00 or any aspect thereof may be implemented in any environment.

The embodiment exemplified in FIG. 3A depicts a statistical measurement curve 302 superimposed over a histogram chart pertaining to average ping time. The abscissa of the chart is a linear scale of time in milliseconds. The plot depicts the average ping times as were measured and filtered for the shown nodes. In this example, groups of nodes are shown as being centered around 3 milliseconds, however there is one node (see node $N_{RM}$) that exhibits a much longer ping time of approximately 6 milliseconds. Using the statistical measurement curve 302, the node $N_{RM}$ is deemed as being an outlier 304. An outlier might be subjected to further scrutiny so as to identify it (or exclude it) as being a candidate for alerts and/or remediation.

The aforementioned technique involving the statistical measurement curve is merely one approach to identify an outlier. FIG. 3B depicts alternative approaches.

FIG. 3B is a diagram depicting an alternate outlier identification technique 3B00 as used to manage a multi-node cluster. As an option, one or more variations of alternate outlier identification technique 3B00 or any aspect thereof may be implemented in the context of the architecture and functionality of the embodiments described herein. The alternate outlier identification technique 3B00 or any aspect thereof may be implemented in any environment.

The plot of FIG. 3B depicts several series of measurements taken over a time period. The abscissa gives an indication of a time or timeframe (e.g., hours, minutes) during which measurements were taken. As can be seen, the measurements are stochastic. Measurements taken at one moment in time might differ significantly from measurements taken at a different time. The mere variation in the measurements over time is not necessarily an indication that there are any outliers. In fact, after normalizing for time, it might be that none of the individual measurements plotted are statistical outliers once the normalization for time has been accomplished. In some cases, large variations of measurements over many nodes might be present in a dataset, yet none of the measurements in the dataset are deemed to be indicative of an outlier data point, and/or none of the measurements are deemed to be indicative of a stalled or low-performing or low-scoring node.

In some cases, the measurement data is the same or similar to measurement data pertaining to known computing effects. Scores can be calculated using any individual scoring method or combinations of scoring methods or variations of known scoring methods. Further, in some cases, the algorithms used for score calculation can be taken from peripheral areas of computer science. Strictly as an example, one algorithm used to calculate a score is based on the additive-increase/multiplicative-decrease (AIMD) algorithm used for TCP congestion avoidance.

The algorithm maintains a set of previously reported scores for each node. The ratio of timeouts to responses is then calculated. If the timeout vs. response ratio is 0, the score decreases linearly. If the ratio observed on the node is non-zero, the score is multiplicatively incremented. A selection of decrement and increment calculation methods are presented below.

Linear Decrement Calculation Method $$\text{Decrement} = \frac{100 \times \text{fetch\_degraded\_stats\_interval\_secs}}{\text{healthy\_node\_detection\_time\_interval\_secs}} \quad (\text{EQ. 1})$$

where:
fetch_degraded_stats_interval_secs=
  Frequency at which the scores would be calculated and reported to a score monitor; default is 5 seconds.
healthy_node_detection_time_interval_secs=
  Maximum time interval for which the timeout:response ratio observed on the degraded node needs to be 0 to reach a degraded_node_score of 0 (where a 0 score denotes a healthy node); default is 3 minutes.

Multiplicative Increment Calculation Method $$\text{Increment} = \frac{\min(\text{timeout\_response\_ratio}, \text{degraded\_node\_threshold})}{\text{degraded\_node\_threshold}} \times \text{prev\_scores} \times \text{degraded\_node\_multiplier}$$

where:
prev_scores=
  Score reported to a monitor during the previous iteration.
degraded_node_threshold=
  A static threshold for the timeout:response ratio above which the scores get a maximum increment.
degraded_node_multiplier=
  Amount by which to multiply if bad scores are seen.

As aforementioned, these methods maintain a set of previously reported scores for each node. The scores for each node can be captured by multiple peer nodes (e.g., neighboring nodes). Determination of peer or neighboring nodes can be based on any node grouping technique, which in turn can be based on any peer grouping rules or proximity rules or grouping heuristics.

Figure 4:
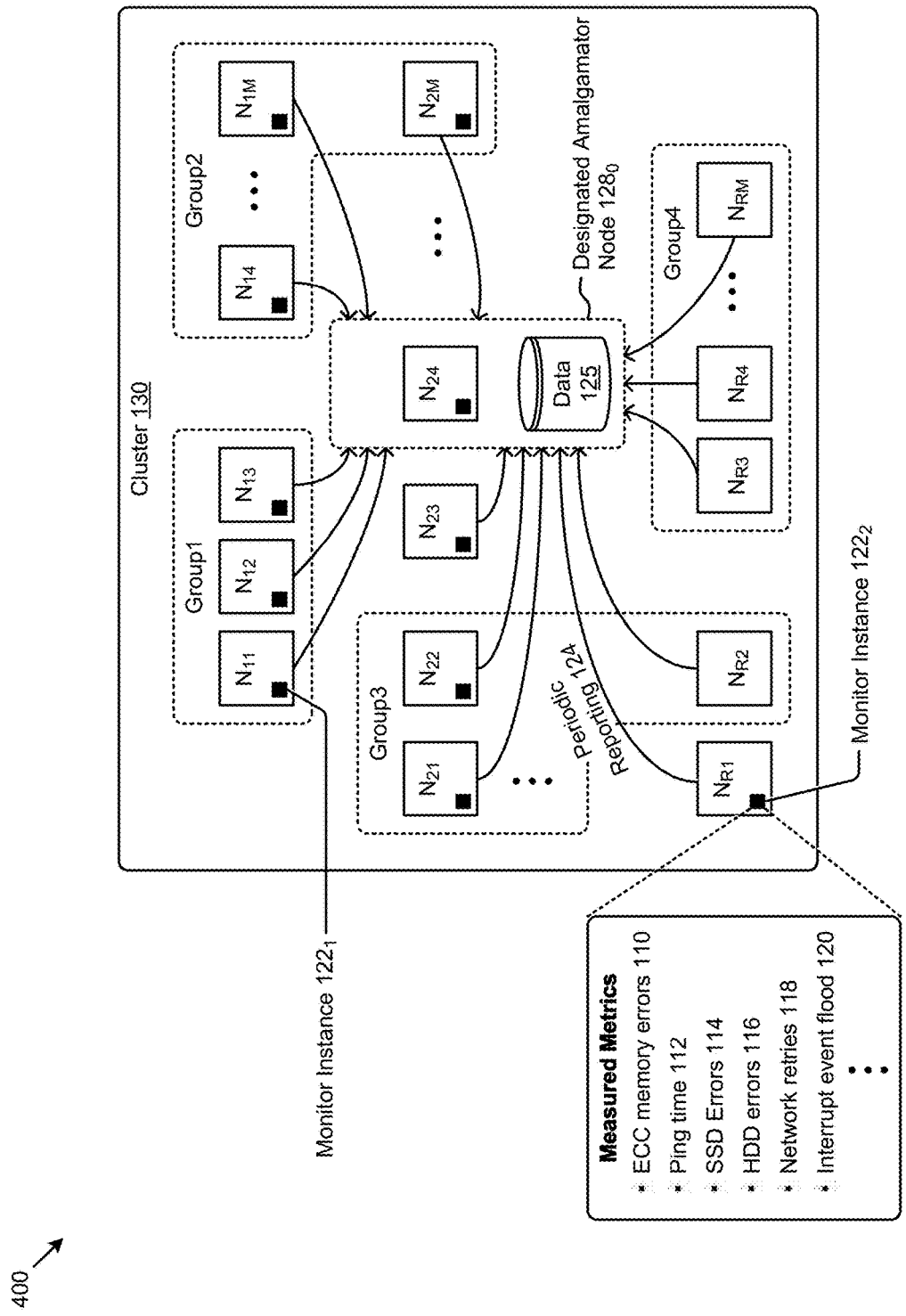
FIG. 4 is a diagram depicting a node grouping technique as used to manage resilience in a multi-node cluster, according to an embodiment.

FIG. 4 is a diagram depicting a node grouping technique 400 as used to manage resilience in a multi-node cluster. As an option, one or more variations of node grouping technique 400 or any aspect thereof may be implemented in the context of the architecture and functionality of the embodiments described herein. The node grouping technique 400 or any aspect thereof may be implemented in any environment.

The embodiment shown in FIG. 4 depicts four peer groups (e.g., group1, group2, group3, and group4). The shown groups are formed by selecting a random number of peers and drawing them into a group. Groups can comprise mutually-exclusive sets of nodes (as shown), or groups can be composed of a node or nodes that are drawn into two or more groups.

In exemplary cluster configurations any of the nodes within a computing cluster can communicate to any other node in the same cluster. More specifically, any of the peer nodes within a computing cluster can communicate to a designated amalgamator node $128_0$. A possible protocol for communications between peers and a designated amalgamator node are now briefly discussed.

Figure 5:
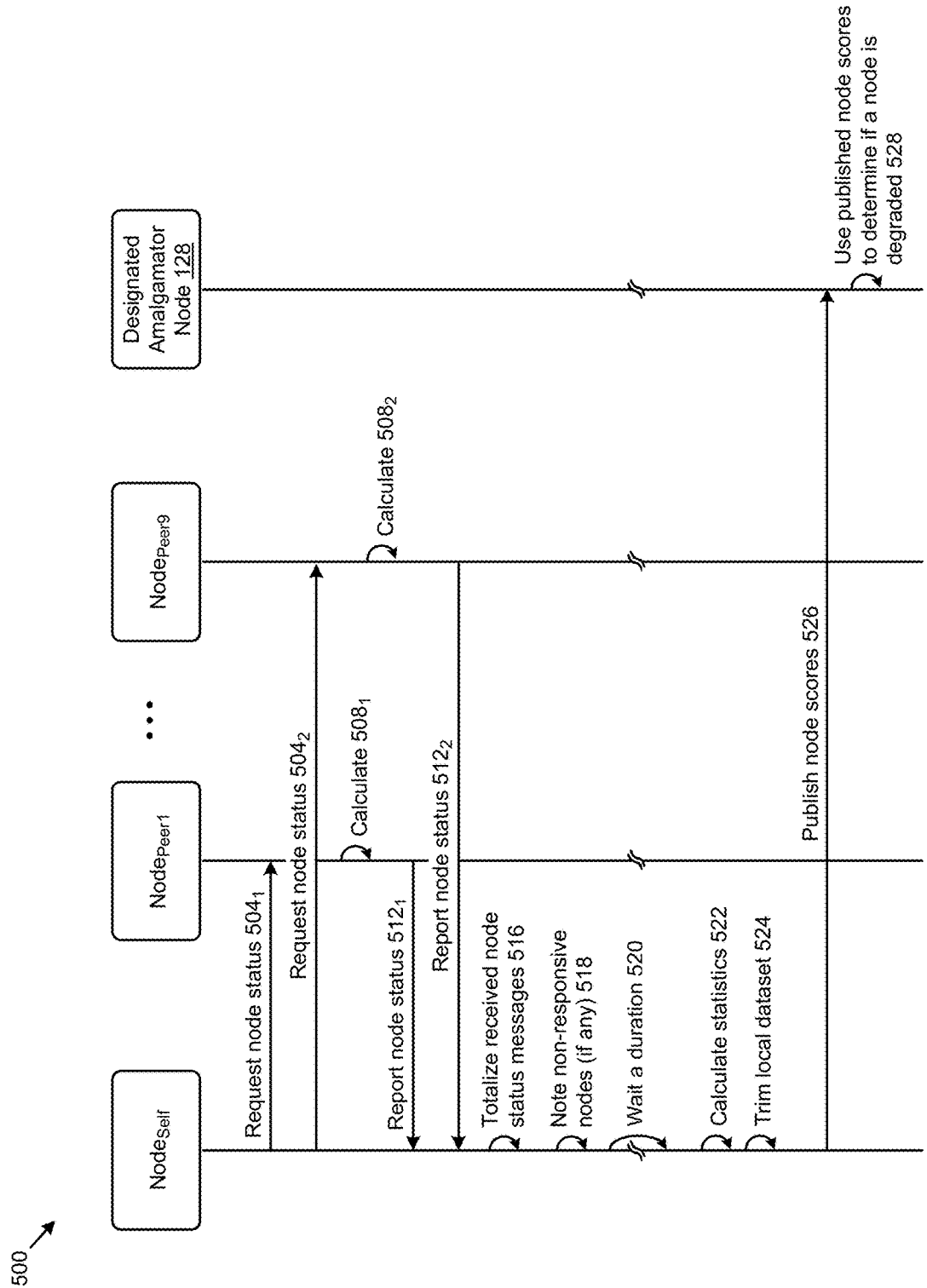
FIG. 5 depicts a protocol as used for publishing node scores to an amalgamator node, according to an embodiment.

FIG. 5 depicts a protocol 500 as used for publishing node scores to an amalgamator node. As an option, one or more variations of protocol 500 or any aspect thereof may be implemented in the context of the architecture and functionality of the embodiments described herein. The protocol 500 or any aspect thereof may be implemented in any environment.

As shown, any peer node (e.g., $\text{Node}_{Self}$) communicates with any number of peers in its peer group (e.g., $\text{Node}_{Peer1}, \ldots, \text{Node}_{Peer9}$). Further, a peer node (e.g., $\text{Node}_{Self}$) communicates with a designated amalgamator node 128. A node might comprise a monitor instance, which in turn carries out all or portions of protocol 500. In this example, a particular node (e.g., $\text{Node}_{Self}$ as shown) emits node status request messages (e.g., request node status $504_1$, request node status $504_2$) to each of a set of peers in its group. The receiving nodes calculate their status in response to the node status request message (e.g., see calculate $508_1$ and calculate $508_2$). Once calculated, the receiving nodes report their status to the requestor (report node status $512_1$, and report node status $512_2$). The requesting node can then totalize received messages (e.g., using the totalize received node status messages 516), note any nonresponsive nodes, if any (operation 518), and enter into a short wait state (operation 520). Having received status reports from peer nodes, the particular node can calculate statistics (operation 522), trim the dataset so as to eliminate spurious or stale data (operation 524), and then publish the set of node scores to the designated amalgamator node (message 526). The designated amalgamator node determines if a node should be deemed to be degraded by performing calculations over published node scores (operation 528).

The protocol 500 serves to provide the designated amalgamator node with observations (e.g., raw observations, normalized observations, filtered observations, etc.), however further processing is undertaken so as to identifying low-performing nodes. The following FIG. 6 and FIG. 7 show and discuss flows used for processing node data and identifying low-performing or stalled nodes.

Figure 6:
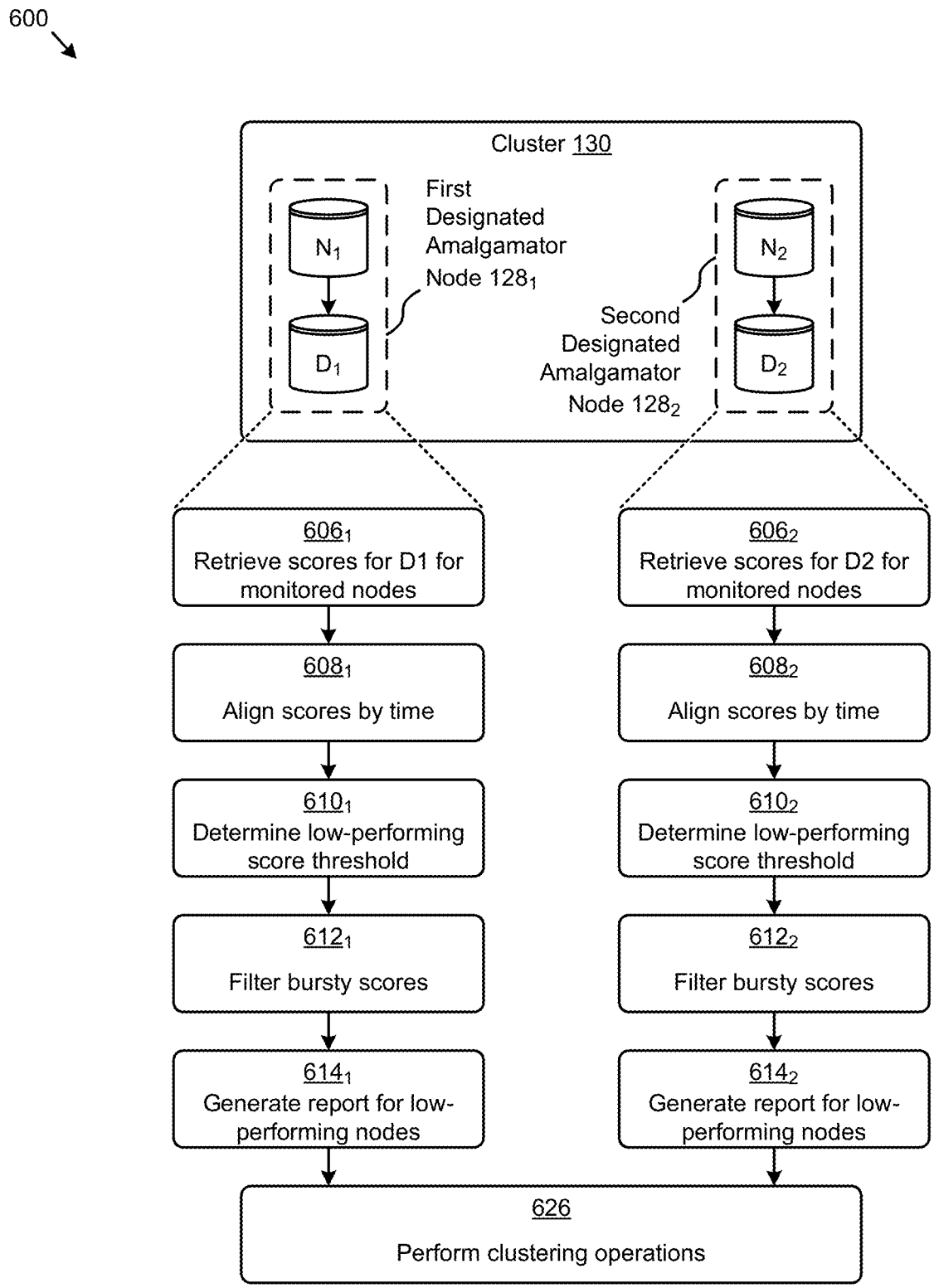
FIG. 6 depicts an operation flow as used by amalgamator nodes to preprocess node performance data for identifying low-performing nodes, according to some embodiments.
Figure 7:
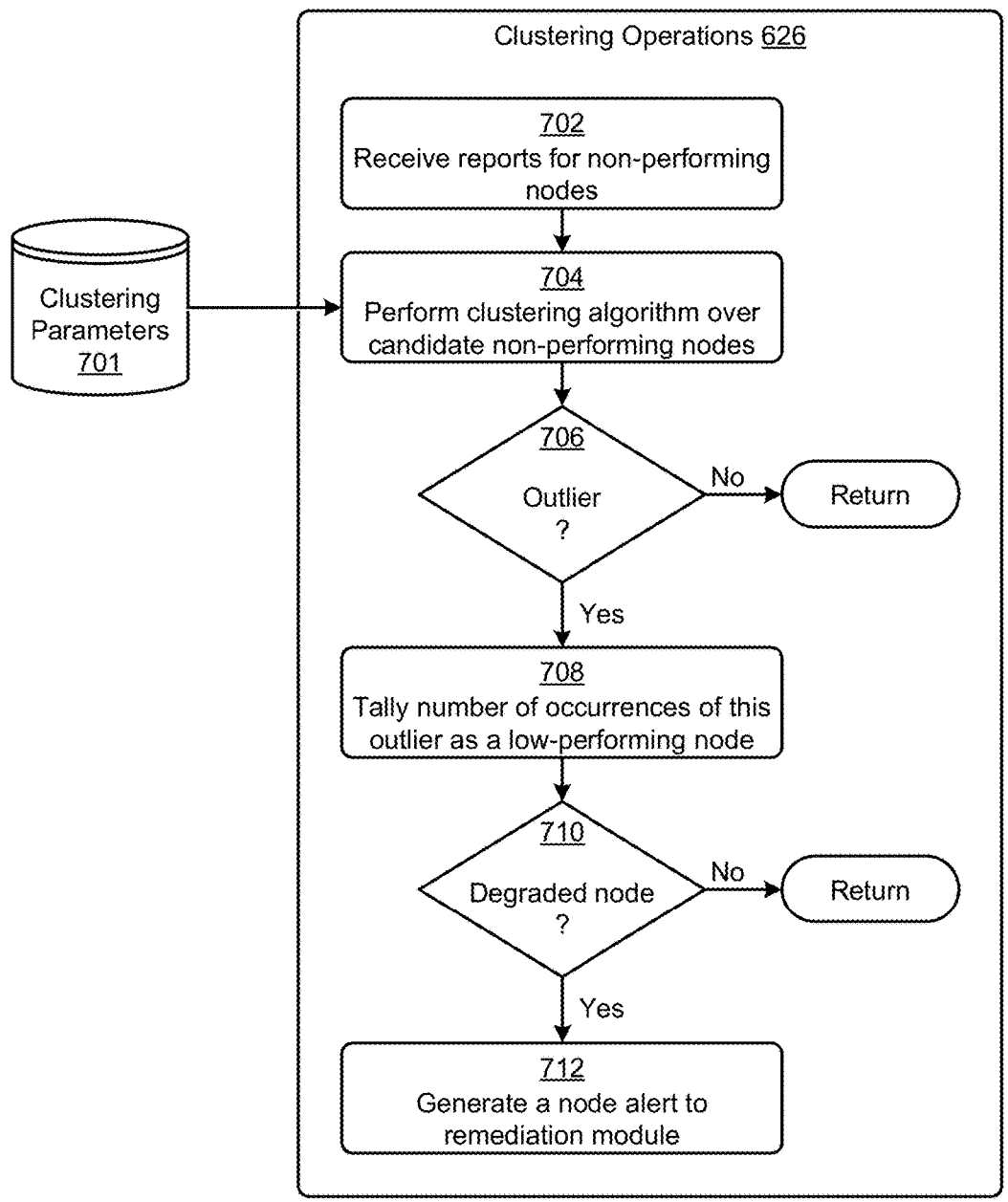
FIG. 7 depicts a series of clustering operations as used to identify low-performing nodes, according to some embodiments.

FIG. 6 depicts an operation flow 600 as used by amalgamator nodes to preprocess node performance data for identifying low-performing nodes. As an option, one or more variations of operation flow 600 or any aspect thereof may be implemented in the context of the architecture and functionality of the embodiments described herein. The operation flow 600 or any aspect thereof may be implemented in any environment.

FIG. 6 depicts a cluster 130 that hosts two designated amalgamator nodes (e.g., first designated amalgamator node $128_1$ and second designated amalgamator node $128_2$). Each of the two designated amalgamator nodes perform the same or similar reporting steps on their respective datasets (e.g., the shown dataset D1 and dataset D2). Using respective amalgamated data, each of the two designated amalgamator nodes perform steps to retrieve scores from its respective dataset (at step $606_1$ and step $606_2$). The data retrieved from its respective datastore might derive from sets of nodes taken from mutually-exclusive groups (e.g., with no nodes in common between the sets), or the data retrieved from its respective datastore might derive from sets of nodes taken from groups that intersect with one or more nodes. The retrieved data is processed to align scores by time (at step $608_1$ and at step $608_2$). Time-wise collection and/or alignment of scores (e.g., to consider a set of scores that were collected over a particular time period) might include eliminating or reducing the weighting of scores that are deemed to be outside of a then-current measurement window of interest.

Having a set of node scores that have been timewise aligned, subsequent steps serve to determine a low-performing threshold. As earlier indicated, a low score at one moment in time might not necessarily indicate that the node should be deemed to be a low-performing node. Accordingly, a low-performing score threshold might need to be dynamically calculated (e.g., vis-à-vis variations over time). At step $610_1$ and step $610_2$, a low score threshold is calculated so as to be a good predictor (e.g., within a given confidence threshold) of a low-performing node. Bursts of scores that breach a threshold can be eliminated without reducing the likelihood of identifying low-performing nodes. Burst-related calculations are performed at step $612_1$ and at step $612_2$. Such burst-related scores are considered separately by each designated amalgamator node.

Having preprocessed a set of node scores, some of which might breach a threshold, each designated amalgamator node generates a report (e.g., at step $614_1$ and step $614_2$) that includes a list of what are deemed as candidate low-performing nodes. These reports (e.g., from any number of designated amalgamator nodes) are prepared for clustering operations 626.

The clustering operations can be performed by any node, possibly in a redundant setting. As shown, the clustering operations are performed by each designated amalgamator node, however many partitioning choices to locate clustering operations to one node or another node, in whole or in part, is possible.

FIG. 7 depicts a series of clustering operations 700 as used to identify low-performing nodes. As an option, one or more variations of clustering operations 700 or any aspect thereof may be implemented in the context of the architecture and functionality of the embodiments described herein. The clustering operations 700 or any aspect thereof may be implemented in any environment.

The embodiment shown in FIG. 7 is merely one example. As shown, the clustering operations 626 commences upon receiving reports of candidate low-performing nodes (at step 702). The cluster algorithms are performed over the data (at step 704), possibly using automatically-determined and/or predetermined clustering parameters 701. Outliers (if any) are detected (at decision 706). Even in the case that there is an outlier from among the candidate low-performing nodes, such a candidate low-performing node is not necessarily instantly convicted as being a low-performing node. In some cases the clustering operations tally the occurrence of events that are deemed by a particular node to be an outlier (at step 708). In the event that the same candidate low-performing node has been repeatedly seen to be an outlier, then the candidate low-performing node might be deemed to be a degraded node (decision 710). If a candidate low-performing node is indeed deemed to be a degraded node, then an alert is generated and forwarded to a remediation module (at step 712).

Multiple nodes can run clustering operations 626 in parallel on different nodes over the same or similar dataset so that just a single node is not relied upon to detect a degraded node. For example, every node in a node group can run clustering operations 626 in parallel where their respective datasets are substantially similar or identical.

A remediation module might receive a large number of reports that include identification of one or more nodes that have been deemed to be a degraded node. However, before any remediation action is initiated, the corpus of reports that include identification of one or more nodes that have been deemed to be a degraded node are collated so as to present an aggregate view. That is, the aforementioned reports that include identification of one or more nodes that have been deemed to be degraded nodes are reports that give respective views of the cluster as seen by specific instances of specific instance monitors over a time interval. It is possible than some views from some nodes present a more dire condition of a node, while other views from other nodes present a more rosy condition of a node. Accordingly, median scores are calculated for a given moment in time. When aggregated scores for all reporting nodes are available, the 30th percentile score is picked. This 30th percentile is considered to be a "bad percentile" score such that short term bad scores are eliminated (e.g., to account for bursty behavior).

Those nodes that have bad percentile scores are clustered using a clustering algorithm (e.g., the density-based spatial clustering of applications with noise (DBSCAN) algorithm). Clustering parameters are computed to detect one or zero outliers in the cluster. If the clustering algorithm reports zero outlier nodes, then it is deemed that there is no degraded node in the cluster. However, in the case that there is an outlier, steps are taken to verify that the potentially degraded node has indeed been in operation. If so, an alert is issued for the benefit of a remediator (see FIG. 8A and FIG. 8B).

The aforementioned candidate determination and clustering operations serve to detect a degraded node in many situations, including cases such as degradation due to CPU soft lock ups, memory problems, disk failures, and persistent high network latency, among others.

Figure 8A:
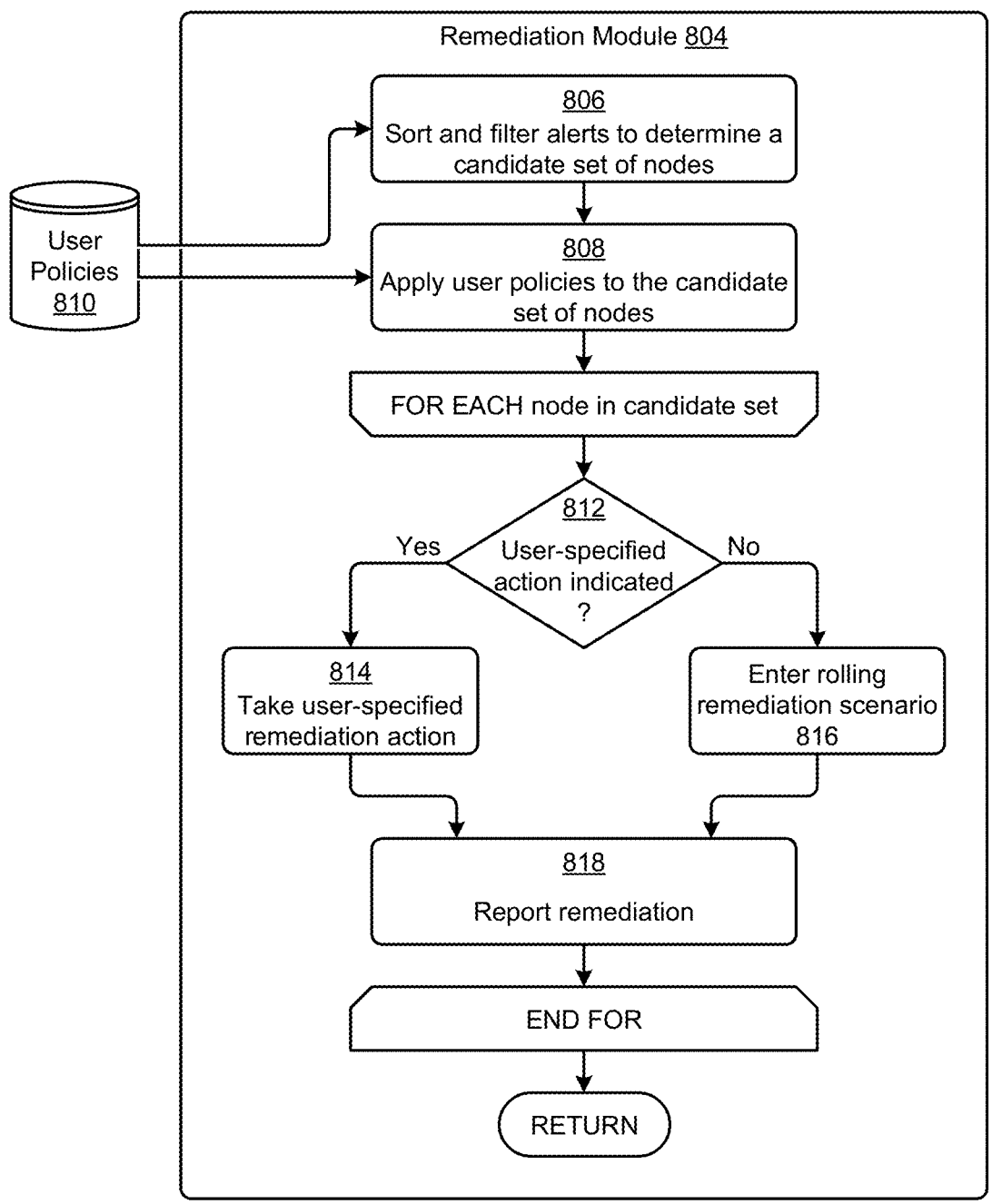
FIG. 8A and FIG. 8B depict a series of remediation operations as used to identify and initiate remediation actions, according to some embodiments.

FIG. 8A depicts a series of remediation operations 8A00 as used to identify and initiate remediation actions. As an option, one or more variations of remediation operations 8A00 or any aspect thereof may be implemented in the context of the architecture and functionality of the embodiments described herein. The remediation operations 8A00 or any aspect thereof may be implemented in any environment.

A remediation module 804 can be hosted within a subject cluster or in an external environment or on another cluster. A series of operations are undertaken so as to identify candidate remediation actions to be taken, possibly relying on user policies 810. Such user policies might be used during operations to sort and filter alerts (at step 806) and/or during the application of user policies to the candidate nodes (at step 808). In some cases such as after filtering and after application of user policies to the candidate nodes, there may be one or more nodes that can be subjected to automatic initiation of remediation actions.

As shown, if there are one or more actions indicated (e.g., a user-specified action) pertaining to the circumstances of the candidate node (decision 812), then remediation actions can be taken (at step 814) such as remediation actions as may be based on or derived from user-specified actions. On the other hand, if there is no specific user-policy for remediation actions as pertaining to the circumstances of the candidate node, a rolling remediation scenario 816 is initiated. Regardless of which branch of decision 812 is taken, the nature of the remediation is reported (at step 818). An administrator can interpret the actions taken and can make decisions pertaining to the long-term health of the cluster. In some cases, a faulty node (e.g., due to a faulty chip or faulty board) can be detected, remediated (e.g., by replacing the faulty node with a known-good node), and the administrator can initiate replacements. An administrator can override default actions by specifying alternative one or more actions selected from a set of available actions.

Figure 8B:
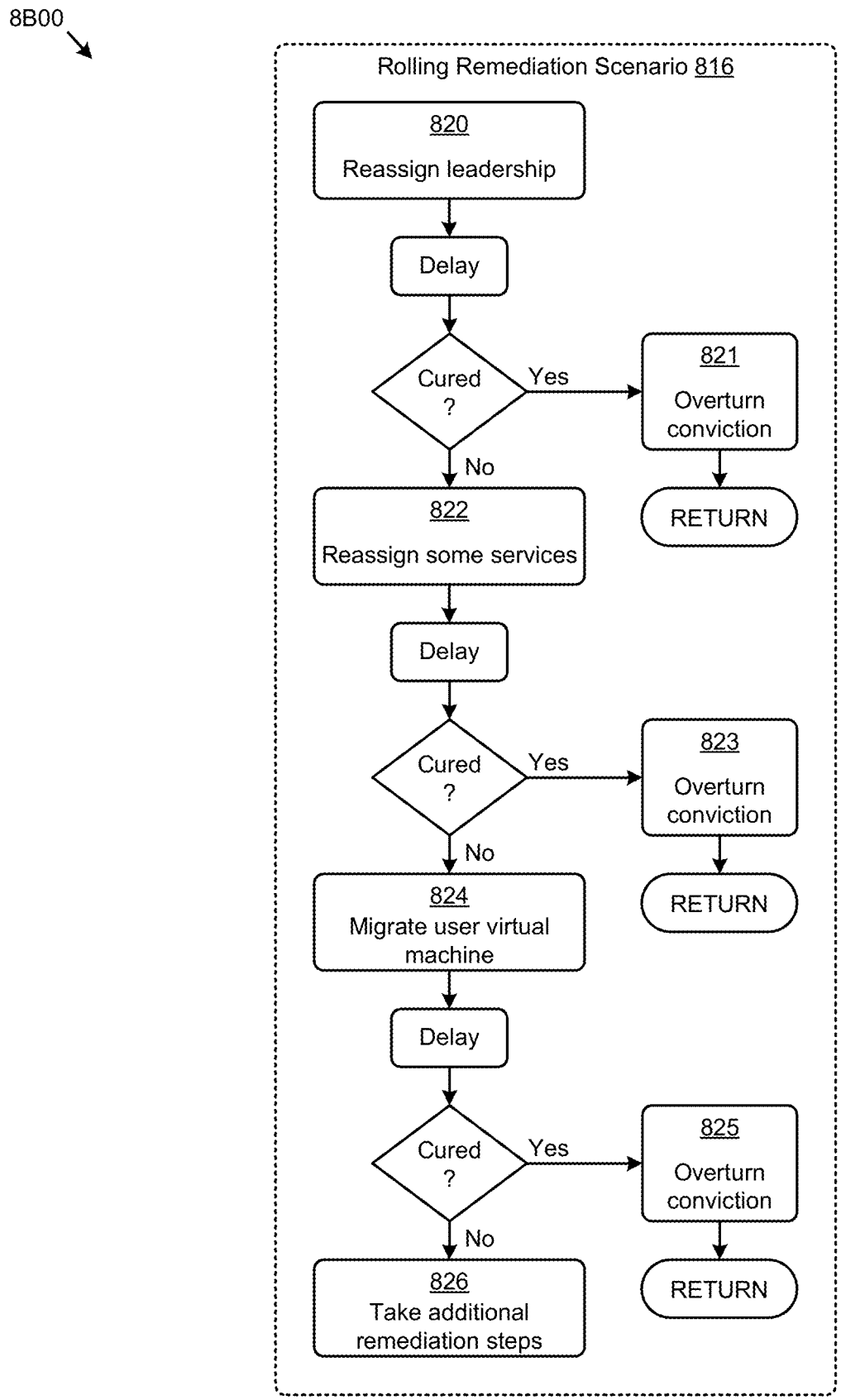

FIG. 8B depicts a series of remediation operations 8B00 as used to identify and initiate remediation actions in a rolling remediation scenario 816. As depicted, the remediation operations can be taken based on taking the "No" branch of decision 812. The rolling remediation performs one remediation action at a time, then waits a short duration, then checks to see if the node has been cured. The time to delay is variable, depending on the specific remediation action taken. In many cases, the detail is relatively short, and a cure determination is made based on observations. In other cases the detail is relatively longer, and a cure determination is made based on alerts or a frequency of alerts, or based on a decline in frequency of alerts that had occurred during the delay.

As shown, one remediation action can be to reassign leadership roles from the suspect node to another node (step 820). If, after a delay the suspect node is deemed to be cured, then the conviction of the suspect node as a suspect degraded node can be overturned (step 821). Also as shown, a next remediation action can be to reassign some services from the suspect node to another node (step 822). If, after a delay the suspect node is deemed to be cured, then the conviction of the suspect node as a suspect degraded node can be overturned (step 823). A still further remediation action can be to migrate some virtual machines (e.g., virtual machines that are measured to be under stress) from the suspect node to another node (step 824). If, after a delay the suspect node is deemed to be cured, then the conviction of the suspect node as a suspect degraded node can be overturned (step 825). In many rolling remediation scenarios, still further remediation steps can be taken (step 826).

In accordance with some remediation techniques, a series of remediation steps can be pre-planned to order remediation actions so as to minimize the severity of impact to the node. For example, a plan might include determination of a set of services to be stopped or migrated in a particular order. A plan might include determination of conditions, the presence of which serve as indications that a virtualized controller (or operations thereof) is to be stopped or migrated or suspended as a part of the remediation activities.

Figure 9:
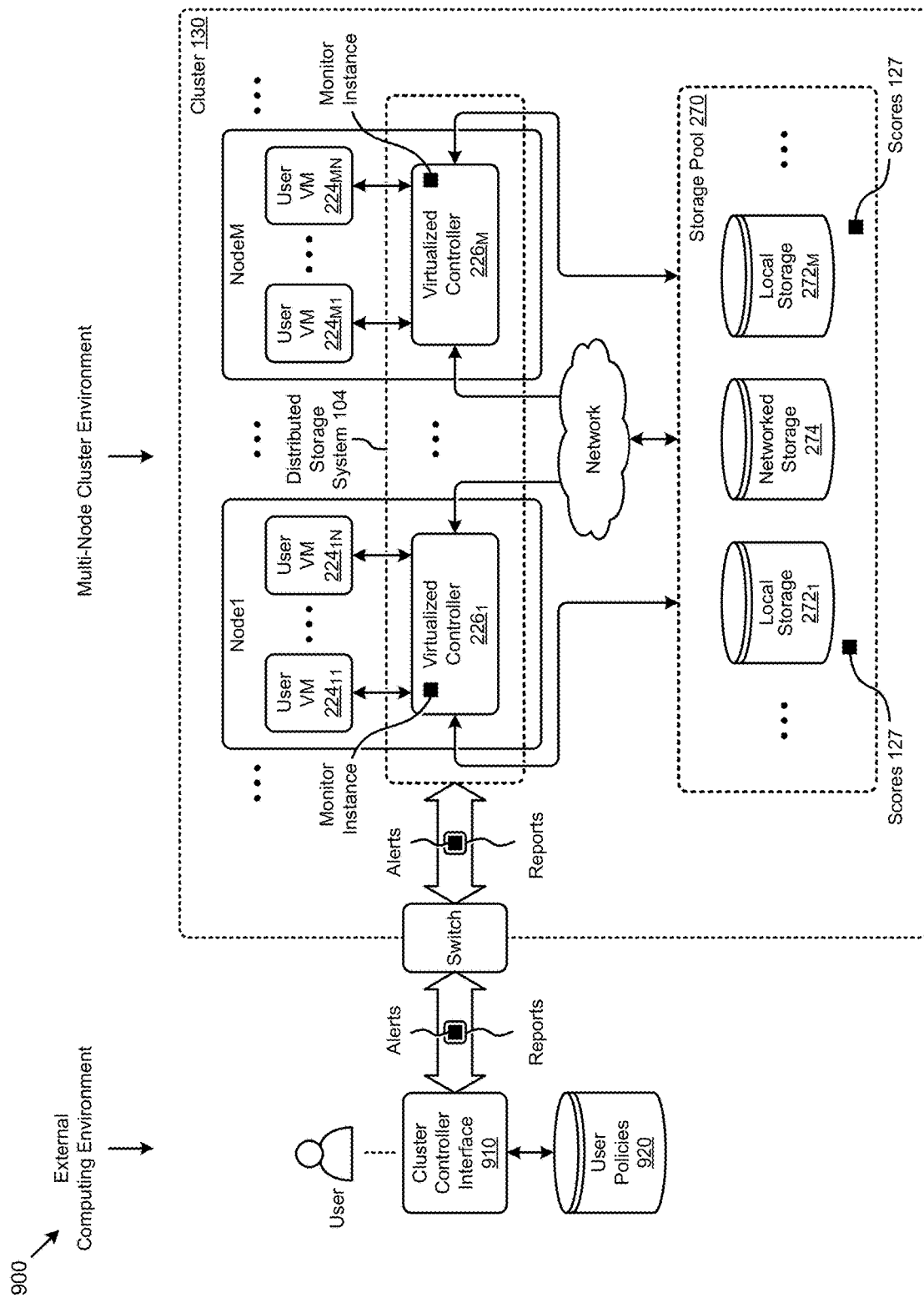
FIG. 9 is a diagram depicting a remediation technique as used to manage a multi-node cluster having virtualized controllers, according to an embodiment.

FIG. 9 is a diagram depicting a remediation technique 900 as used to manage a multi-node cluster having virtualized controllers. As an option, one or more variations of remediation technique 900 or any aspect thereof may be implemented in the context of the architecture and functionality of the embodiments described herein. The remediation technique 900 or any aspect thereof may be implemented in any environment.

Based on user policies 920, actions initiated or taken by a user using a cluster controller interface 910 can include revoking leadership roles of certain components on the degraded node and/or initiating a reboot and/or putting the degraded node virtualized controller in a maintenance mode or initiating a shutdown of the degraded node. In case no user policy is specified, certain components on the degraded node are killed and are not allowed to volunteer for leadership once they restart. In a subsequent phase, the node carrying out degraded node actions asks its local node monitoring process to reboot the degraded node virtualized controller. Once the degraded node virtualized controller comes back up, it is put into a maintenance mode and services are not started on that node. In yet another phase, a monitor requests a cluster controller to shut down the degraded node.

Additional Embodiments of the Disclosure

Additional Practical Application Examples

Figure 10A:
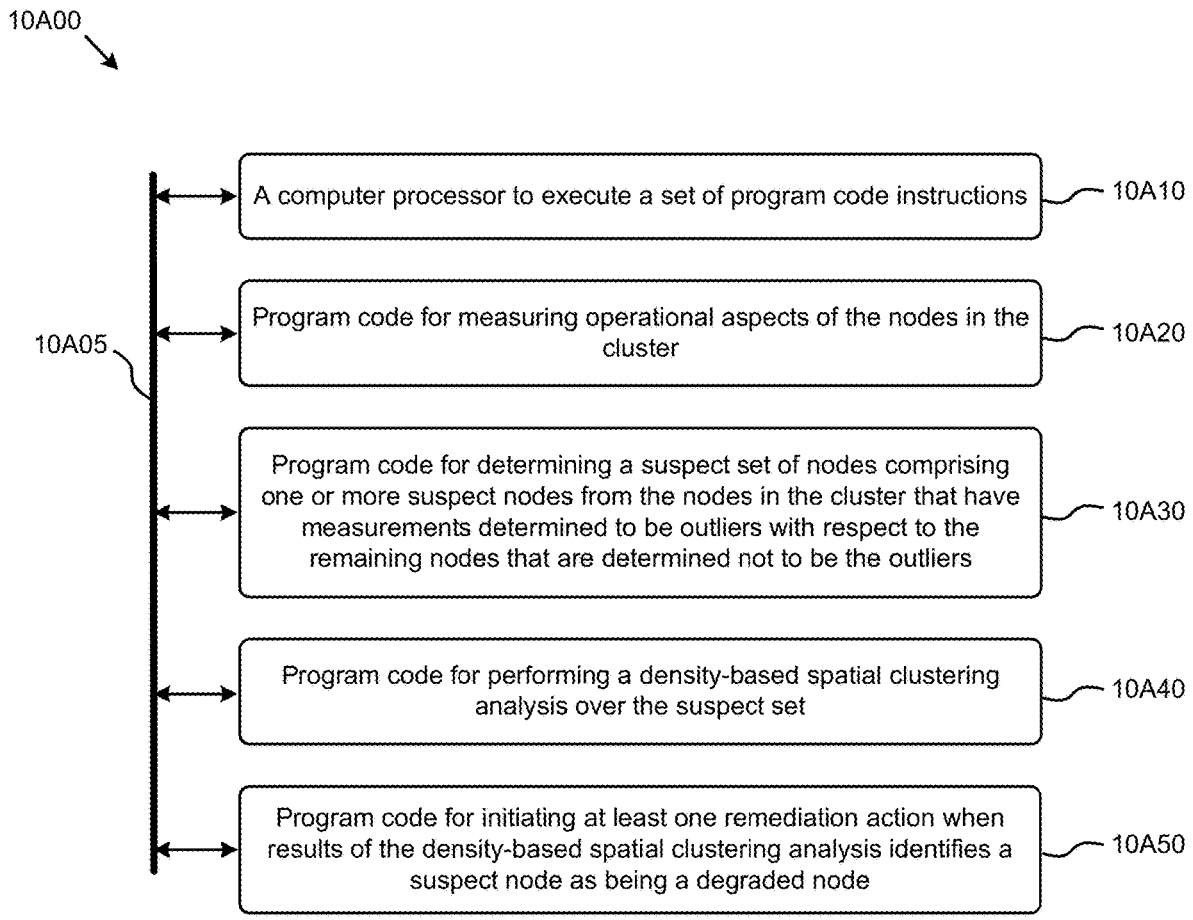
FIG. 10A and FIG. 10B depict system components as arrangements of computing modules that are interconnected so as to implement certain of the herein-disclosed embodiments.

FIG. 10A depicts a system 10A00 as an arrangement of computing modules that are interconnected so as to operate cooperatively to implement certain of the herein-disclosed embodiments. The partitioning of system 10A00 is merely illustrative and other partitions are possible. As an option, the system 10A00 may be implemented in the context of the architecture and functionality of the embodiments described herein. Of course, however, the system 10A00 or any operation therein may be carried out in any desired environment.

The system 10A00 comprises at least one processor and at least one memory, the memory serving to store program instructions corresponding to the operations of the system. As shown, an operation can be implemented in whole or in part using program instructions accessible by a module. The modules are connected to a communication path 10A05, and any operation can communicate with other operations over communication path 10A05. The modules of the system can, individually or in combination, perform method operations within system 10A00. Any operations performed within system 10A00 may be performed in any order unless as may be specified in the claims.

The shown embodiment implements a portion of a computer system, presented as system 10A00, comprising a computer processor to execute a set of program code instructions (module 10A10) and modules for accessing memory to hold program code instructions to perform: measuring operational aspects of the nodes in the cluster (module 10A20); determining a suspect set of nodes comprising one or more suspect nodes from the nodes in the cluster that have measurements determined to be outliers with respect to the remaining nodes that are determined not to be the outliers (module 10A30); performing a density-based spatial clustering analysis over the suspect set (module 10A40); and initiating at least one remediation action when results of the density-based spatial clustering analysis identifies a suspect node as being a degraded node (module 10A50).

Variations of the foregoing may include more or fewer of the shown modules, and variations may perform more or fewer (or different) steps and/or may use data elements in more or in fewer (or different) operations.

Strictly as examples, some embodiments include:

Variations where the remediation action includes deploying a substitute node.

Variations where the remediation action includes deploying a reboot of one or more software components running on the degraded node.

Figure 10B:
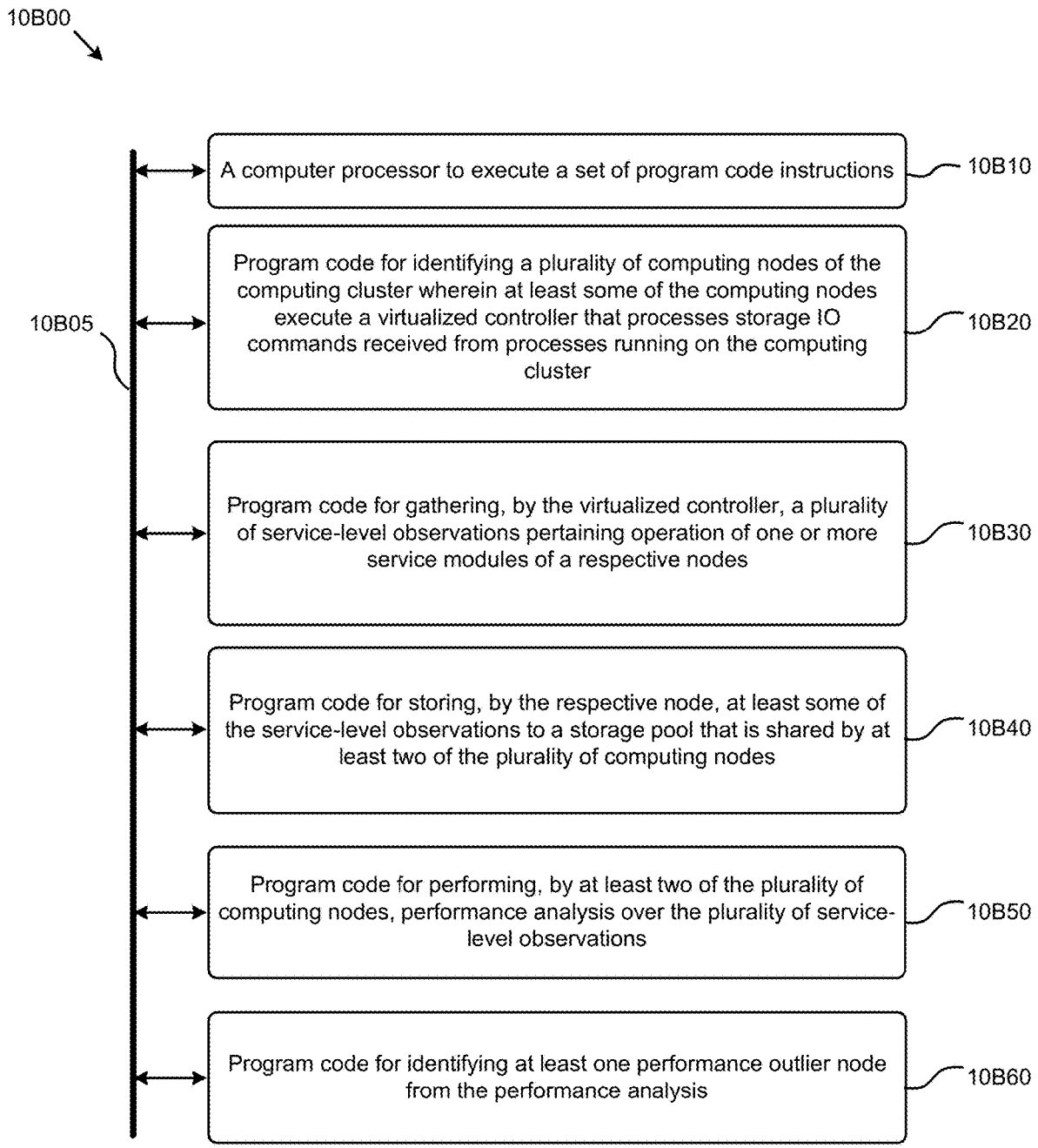

FIG. 10B depicts a system 10B00 as an arrangement of computing modules that are interconnected so as to operate cooperatively to implement certain of the herein-disclosed embodiments. The partitioning of system 10B00 is merely illustrative and other partitions are possible. As an option, the system 10B00 may be implemented in the context of the architecture and functionality of the embodiments described herein. Of course, however, the system 10B00 or any operation therein may be carried out in any desired environment. The system 10B00 comprises at least one processor and at least one memory, the memory serving to store program instructions corresponding to the operations of the system. As shown, an operation can be implemented in whole or in part using program instructions accessible by a module. The modules are connected to a communication path 10B05, and any operation can communicate with other operations over communication path 10B05. The modules of the system can, individually or in combination, perform method operations within system 10B00. Any operations performed within system 10B00 may be performed in any order unless as may be specified in the claims. The shown embodiment implements a portion of a computer system, presented as system 10B00, comprising a computer processor to execute a set of program code instructions (module 10B10) and modules for accessing memory to hold program code instructions to perform: identifying a plurality of computing nodes of the computing cluster wherein at least some of the computing nodes execute a virtualized controller that processes storage IO commands received from processes running on the computing cluster (module 10B20); gathering, by the virtualized controller, a plurality of service-level observations pertaining operation of one or more service modules of a respective node (module 10B30); storing, by the respective node, at least some of the service-level observations to a storage pool that is shared by at least two of the plurality of computing nodes (module 10B40); performing, by at least two of the plurality of computing nodes, performance analysis over the plurality of service-level observations (module 10B50); and identifying at least one performance outlier node from the performance analysis (module 10B60).

System Architecture Overview

Additional System Architecture Examples

Figure 11A:
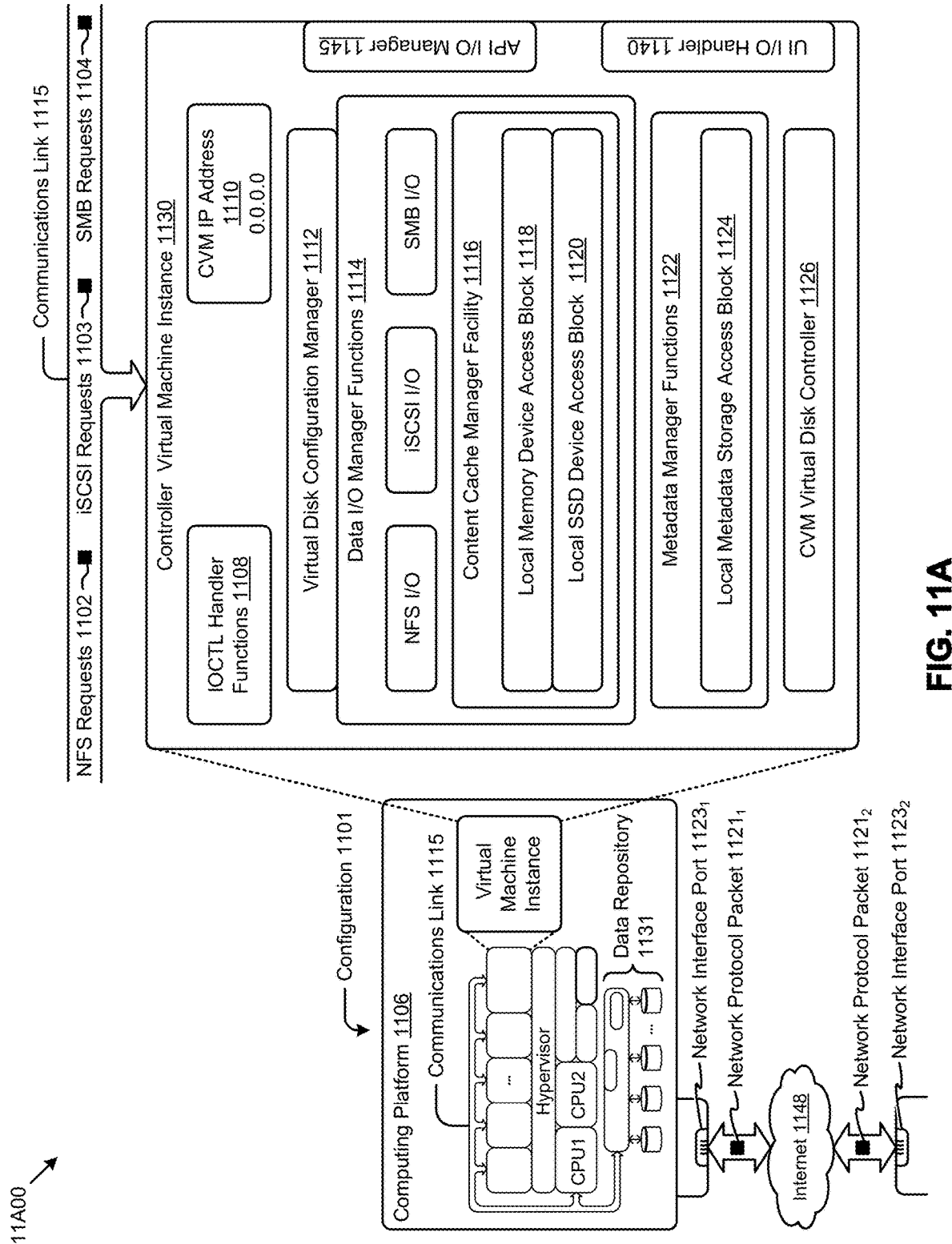
FIG. 11A and FIG. 11B depict virtualized controller architectures comprising collections of interconnected components suitable for implementing embodiments of the present disclosure and/or for use in the herein-described environments.

FIG. 11A depicts a virtualized controller as implemented by the shown virtual machine architecture 11A00. The virtual machine architecture comprises a collection of interconnected components suitable for implementing embodiments of the present disclosure and/or for use in the herein-described environments. Moreover, the shown virtual machine architecture 11A00 includes a virtual machine instance in a configuration 1101 that is further described as pertaining to the controller virtual machine instance 1130. A controller virtual machine instance receives block I/O (input/output or IO) storage requests as network file system (NFS) requests in the form of NFS requests 1102, and/or internet small computer storage interface (iSCSI) block IO requests in the form of iSCSI requests 1103, and/or Samba file system (SMB) requests in the form of SMB requests 1104. The controller virtual machine (CVM) instance publishes and responds to an internet protocol (IP) address (e.g., see CVM IP address 1110). Various forms of input and output (I/O or IO) can be handled by one or more IO control handler functions (IOCTL functions 1108) that interface to other functions such as data IO manager functions 1114 and/or metadata manager functions 1122. As shown, the data IO manager functions can include communication with a virtual disk configuration manager 1112 and/or can include direct or indirect communication with any of various block IO functions (e.g., NFS IO, iSCSI IO, SMB IO, etc.).

In addition to block IO functions, the configuration 1101 supports IO of any form (e.g., block IO, streaming IO, packet-based IO, HTTP traffic, etc.) through either or both of a user interface (UI) handler such as UI IO handler 1140 and/or through any of a range of application programming interfaces (APIs), possibly through the shown API IO manager 1145.

The communications link 1115 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 1130 includes a content cache manager facility 1116 that accesses storage locations, possibly including local dynamic random access memory (DRAM) (e.g., through the local memory device access block 1118) and/or possibly including accesses to local solid state storage (e.g., through local SSD device access block 1120).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1131, which in turn can be formatted into any one or more storage areas, and which can comprise parameterized storage accessible by a key (e.g., a filename, a table name, a block address, an offset address, etc.). An external data repository 1131 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 1124. The external data repository 1131 can be configured using a CVM virtual disk controller 1126, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 1101 can be coupled by a communications link 1115 (e.g., backplane, LAN, PTSN, wired or wireless network, etc.) and each instance may perform respective portions of sequences of instructions as may be required to practice embodiments of the disclosure.

The shown computing platform 1106 is interconnected to the Internet 1148 through one or more network interface ports (e.g., network interface port 1123$_1$ and network interface port 1123$_2$). The configuration 1101 can be addressed through one or more network interface ports using an IP address. Any operational element within computing platform 1106 can perform sending and receiving operations using any of a range of network protocols, possibly including network protocols that send and receive packets (e.g., see network protocol packet 1121$_1$ and network protocol packet 1121$_2$).

The computing platform 1106 may transmit and receive messages that can be composed of configuration data, and/or any other forms of data and/or instructions organized into a data structure (e.g., communications packets). In some cases, the data structure includes program code instructions (e.g., application code) communicated through Internet 1148 and/or through any one or more instances of communications link 1115. Received program code may be processed and/or executed by a CPU as it is received and/or program code may be stored in any volatile or non-volatile storage for later execution. Program code can be transmitted via an upload (e.g., an upload from an access device over the Internet 1148 to computing platform 1106). Further, program code and/or results of executing program code can be delivered to a particular user via a download (e.g., a download from the computing platform 1106 over the Internet 1148 to an access device).

The configuration 1101 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to detection of degraded nodes in a cluster.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects pertaining to detection of degraded nodes in a cluster). Such files or records can be brought into and/or stored in volatile or non-volatile memory.

Figure 11B:
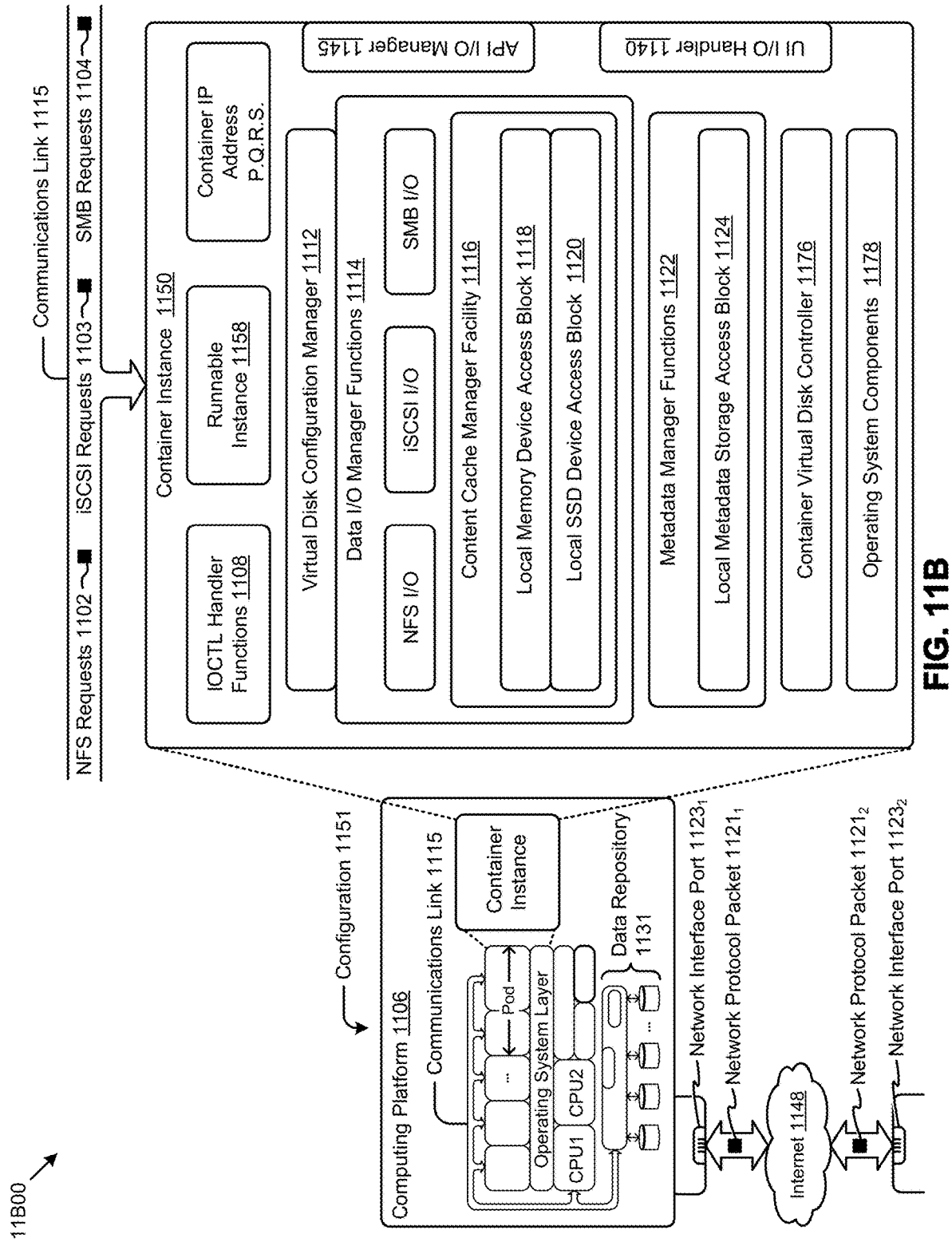

FIG. 11B depicts a virtualized controller implemented by a containerized architecture 11B00. The containerized architecture comprises a collection of interconnected components suitable for implementing embodiments of the present disclosure and/or for use in the herein-described environments. Moreover, the shown containerized architecture 11B00 includes a container instance in a configuration 1151 that is further described as pertaining to the container instance 1150. The configuration 1151 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 1150). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases a configuration of a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container (e.g., a Docker container) can be rooted in a directory system, and can be accessed by file system commands (e.g., "ls" or "ls-a", etc.). The container might optionally include operating system components 1178, however such a separate set of operating system components need not be provided. Instead, a container can include a runnable instance 1158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 1176. Such a container virtual disk controller can perform any of the functions that the aforementioned CVM virtual disk controller 1126 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
    gathering observation data for a first node from multiple nodes that monitor the first node, wherein the observation data from the multiple nodes corresponds to a service performed on the first node in response to at least one request from a respective monitoring node of the multiple nodes;
    generating a score, which corresponds to the service, for the first node based at least in part upon the observation data, wherein the multiple nodes that monitor the first node each generates a respective score for the first node;
    performing a clustering operation upon the first node based at least in part upon the score; and
    identifying the first node as a degraded node based at least in part upon a clustering result of performing the clustering operation on the first node.

2. The method of claim 1, wherein a threshold is used for analysis of the first node as being the degraded node, wherein the threshold corresponds to a response time of a virtual controller on the first node pertaining to the at least one request from a respective virtual controller on a corresponding monitoring node.

3. The method of claim 1, further comprising:
    identifying a second node as a separate degraded node at least by performing a separate clustering operation on separate observation data for the second node gathered by the multiple nodes.

4. The method of claim 1, a threshold is used for analysis of the first node as being the degraded node, wherein the threshold is dynamically calculated.

5. The method of claim 1, further comprising initiating a remediation action for the first node, wherein the remediation action comprises at least one of revoking a leadership role of the first node, reassigning a new leadership role to a different node, reassigning a portion of functions performed by the first node to the different node, migrating a user virtual machine on the first node to the different node in a computing cluster, or any combination thereof.

6. The method of claim 1, wherein the clustering operation comprises tallying occurrences of an event that is considered by a node of the multiple nodes as a candidate low performing node, and a delay is introduced after initiating a first remediation for the first node and before initiating a second remediation.

7. The method of claim 1, wherein the score is amalgamated with other scores for analysis with a statistical technique to identify the degraded node.

8. The method of claim 1, further comprising performing a separate clustering operation on a set of vectors representing the observation data for identifying the first node as a candidate low performing node, wherein the separate clustering operation determines a bound for a group of nodes into which the first node is clustered, wherein the observation data is formatted into the set of vectors.

9. The method of claim 1, further comprising determining a plurality of vectors for the observation data for identifying the first node as a candidate low performing node, wherein a vector of the plurality of vectors is composed of at least one of an inter-node observation or an inter-service observation.

10. The method of claim 1, further comprising removing at least one score from multiple scores that are used in identifying the first node as a candidate low performing node, wherein the at least one score is beyond a scoring threshold that is used to identify candidate low performing nodes.

11. The method of claim 1, wherein the clustering operation comprises a density-based spatial clustering analysis to identify the first node as the degraded node while the observation data of the first node remains within a static observation data threshold.

12. The method of claim 1, wherein scores from the multiple nodes are stored to a distributed database.

13. The method of claim 1, wherein the score corresponds to a raw score that is normalized.

14. The method of claim 1, wherein scores are aggregated to determine a median score for a peer entity.

15. The method of claim 1, wherein the score is calculated using an additive increase or multiplicative decrease approach.

16. A non-transitory computer readable medium having stored thereon a sequence of instructions which, when stored in memory and executed by a processor, causes the processor to perform a set of acts, the set of acts comprising:
    gathering observation data for a first node from multiple nodes that monitor the first node, wherein the observation data from the each of the multiple nodes corresponds to a service performed on the first node in response to at least one request from a respective monitoring node of the multiple nodes;
    generating a score, which corresponds to the service, for the first node based at least in part upon the observation data, wherein the multiple nodes that monitor the first node each generates a respective score for the first node;
    performing a clustering operation upon the first node based at least in part upon the score; and
    identifying the first node as a degraded node based at least in part upon a clustering result of performing the clustering operation on the first node.

17. The non-transitory computer readable medium of claim 16, wherein a threshold is used for analysis of the first node as being the degraded node, wherein the threshold corresponds to a response time of a virtual controller on the first node pertaining to the at least one request from a respective virtual controller on a corresponding monitoring node.

18. The non-transitory computer readable medium of claim 16, wherein the set of acts further comprise identifying a second node as a separate degraded node at least by performing a separate clustering operation on separate observation data for the second node.

19. The non-transitory computer readable medium of claim 16, wherein the set of acts further comprise initiating a first remediation action that alerts a status of the first node, wherein the first node has been identified as the degraded node, and a delay is introduced after initiating the first remediation action and before initiating a second remediation action.

20. The non-transitory computer readable medium of claim 16, wherein the set of acts further comprise initiating a remediation action for the first node, and the remediation action comprises at least one of revoking a leadership role of the first node, reassigning a new leadership role of the first node to a different node in a computing cluster, reassigning a portion of functions of the first node to the different node, migrating a user virtual machine on the first node to the different node, or any combination thereof.

21. The non-transitory computer readable medium of claim 16, wherein a threshold is used for analysis of the first node as being the degraded node, wherein the threshold is dynamically calculated.

22. The non-transitory computer readable medium of claim 16, wherein at least one score amalgamated with other scores for analysis with a statistical technique to identify the degraded node.

23. A system, comprising:
a non-transitory storage medium having stored thereon a sequence of instructions; and
one or more processors that execute the sequence of instructions to cause the one or more processors to perform a set of acts, the set of acts comprising,
gathering observation data for a first node from multiple nodes that monitor the first node, wherein the observation data from the multiple nodes corresponds to a service performed on the first node in response to at least one request from a respective monitoring node of the multiple nodes;
generating a score, which corresponds to the service, for the first node based at least in part upon the observation data, wherein the multiple nodes that monitor the first node each generates a respective score for the first node;
performing a clustering operation upon the first node based at least in part upon the score; and
identifying the first node as a degraded node based at least in part upon a clustering result of performing the clustering operation on the first node.

24. The system of claim 23, wherein the set of acts further comprise initiating a remediation action for the first node, wherein the remediation action comprises at least one of revoking a leadership role of the first node, reassigning a new leadership role to a different node, reassigning a portion of functions of the first node to the different node, migrating a user virtual machine on the first node to the different node, or any combination thereof.

25. The system of claim 23, wherein a threshold is used for analysis of the first node as being the degraded node, wherein the threshold is dynamically calculated.

26. The system of claim 23, wherein the set of acts further comprise performing a separate clustering operation on a set of vectors representing the observation data for the first node, wherein the separate clustering operation determines a bound for a group of nodes into which the first node is clustered, wherein the observation data is formatted into the set of vectors.

27. The system of claim 23, wherein the set of acts further comprise identifying a second node as a separate degraded node at least by performing a separate clustering operation on separate observation data for the second node.

* * * * *